US011190746B2

(12) United States Patent
Goldman et al.

(10) Patent No.: US 11,190,746 B2
(45) Date of Patent: Nov. 30, 2021

(54) REAL-TIME SPACETIME STEREO USING SPACETIME DESCRIPTORS

(71) Applicant: GOOGLE LLC, Mountain View, CA (US)

(72) Inventors: Daniel Goldman, Seattle, WA (US); Harris Nover, Seattle, WA (US); Supreeth Achar, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 39 days.

(21) Appl. No.: 16/710,655

(22) Filed: Dec. 11, 2019

(65) Prior Publication Data
US 2020/0204777 A1    Jun. 25, 2020

Related U.S. Application Data

(60) Provisional application No. 62/783,652, filed on Dec. 21, 2018.

(51) Int. Cl.
*H04N 13/106* (2018.01)
*H04N 13/254* (2018.01)
(Continued)

(52) U.S. Cl.
CPC ........... *H04N 13/106* (2018.05); *G06T 5/001* (2013.01); *G06T 7/11* (2017.01); *G06T 7/174* (2017.01);
(Continued)

(58) Field of Classification Search
None
See application file for complete search history.

(56) References Cited

U.S. PATENT DOCUMENTS

2009/0322859 A1 * 12/2009 Shelton .............. G01B 11/2513
    348/46
2013/0100256 A1    4/2013 Kirk et al.
(Continued)

FOREIGN PATENT DOCUMENTS

CA      2421292 A1 *  3/2002  ............... G06T 7/20
WO    2013/059758 A2    4/2013

OTHER PUBLICATIONS

"PrimeSense", From Wikipedia, Available online at <https://en.wikipedia.org/wiki/PrimeSense> retrieved on Dec. 9, 2019, pp. 1-6.
(Continued)

*Primary Examiner* — Jiangeng Sun
(74) *Attorney, Agent, or Firm* — Brake Hughes Bellermann LLP

(57) ABSTRACT

According to an aspect, a real-time active stereo system includes a capture system configured to capture stereo image data, where the image data includes a plurality of pairs of a reference image and a secondary image, and each pair of the plurality of pairs relates a different temporal window. The real-time active stereo system includes a depth sensing computing system including at least one processor and a non-transitory computer-readable medium having executable instructions that when executed by the at least one processor are configured to execute a local stereo reconstruction algorithm configured to compute spacetime descriptors from the plurality of pairs of the stereo image data and generate depth maps based on the spacetime descriptors.

21 Claims, 14 Drawing Sheets

(51) Int. Cl.
 G06T 7/593 (2017.01)
 G06T 7/11 (2017.01)
 G06T 5/00 (2006.01)
 G06T 7/174 (2017.01)
 H04N 13/00 (2018.01)
(52) U.S. Cl.
 CPC ........... *G06T 7/593* (2017.01); *H04N 13/254* (2018.05); *G06T 2207/10012* (2013.01); *G06T 2207/20021* (2013.01); *H04N 2013/0081* (2013.01)

(56) References Cited

U.S. PATENT DOCUMENTS

| | | | |
|---|---|---|---|
| 2014/0241612 A1 | 8/2014 | Rhemann et al. | |
| 2014/0267350 A1* | 9/2014 | Kass | G06T 15/02 345/589 |
| 2016/0360970 A1* | 12/2016 | Tzvieli | A61B 5/6803 |

OTHER PUBLICATIONS

Bao et al., "GPU-Based Parallelization of a Sub-Pixel High-Resolution Stereo Matching Algorithm for High-Throughput Biomass Sorghum Phenotyping", An ASABE Meeting Presentation, Jul. 26-29, 2015, pp. 1-16.
Besl et al., "A Method for Registration of 3-D Shapes", IEEE Transactions on Pattern Analysis and Machine Intelligence, Feb. 1992, vol. 14, No. 2, pp. 239-256.
Besse et al., "PMBP: Patchmatch Belief Propagation for Correspondence Field Estimation", International Journal of Computer Vision, 2014, vol. 110, No. 1, pp. 2-13.
Bleyer et al., "PatchMatch Stereo—Stereo Matching with Slanted Support Windows", BMVC, Jan. 2011, vol. 201, pp. 1-11.
Calonder et al., "BRIEF: Binary Robust Independent Elementary Features", European Conference on Computer Vision, 2010, pp. 1-14.
Chang et al., "Real-Time Hybrid Stereo Vision System for HD Resolution Disparity Map", Proceedings of the British Machine Vision Conference. BMVA, 2014, pp. 1-11.
Cigla et al., "Information Permeability for Stereo Matching", Signal Processing: Image Communication, 2013, vol. 28, pp. 1072-1088.
Davis et al., "Spacetime Stereo: A Unifying Framework for Depth From Triangulation", IEEE Transactions on Pattern Analysis and Machine Intelligence, Feb. 2005, vol. 27, No. 2, 7 pages.
Fanello et al., "Low Compute and Fully Parallel Computer Vision with HashMatch", IEEE International Conference on Computer Vision (ICCV), 2017, pp. 3874-3883.
Ghosh, "Generating Dense Disparity Maps Using ORB Descriptors", Oct. 31, 2016, pp. 1-12.
Heise et al., "PM-Huber: PatchMatch with Huber Regularization for Stereo Matching", IEEE International Conference on Computer Vision, Dec. 2013, pp. 2360-2367.
Heise et al., "Variational Patchmatch Multiview Reconstruction and Refinement", IEEE International Conference on Computer Vision (ICCV), Dec. 2015, pp. 882-890.
Zhang et al., "Spacetime Stereo: Shape Recovery for Dynamic Scenes", IEEE Computer Society Conference on Computer Vision and Pattern Recognition, Jun. 2003, pp. 367-374.
Li et al., "SPM-BP: Sped-up PatchMatch Belief Propagation for Continuous MRFs", IEEE International Conference on Computer Vision (ICCV), Dec. 2015, pp. 4006-4014.
Lu et al., "PatchMatch Filter: Efficient Edge-Aware Filtering Meets Randomized Search for Fast Correspondence Field Estimation", IEEE Transactions on Pattern Analysis and Machine Intelligence, Sep. 2017, vol. 39, No. 9, pp. 1854-1861.
Taniai, et al., "Continuous 3D Label Stereo Matching Using Local Expansion Moves", IEEE Transactions on Pattern Analysis and Machine Intelligence, 2017, pp. 1-20.
Zollhofer et al., "Real-Time Non-Rigid Reconstruction Using an RGB-D Camera", ACM Transactions on Graphics, Jul. 2014, vol. 33, No. 4, pp. 1-12.
Zabih et al., "Non-parametric Local Transforms for Computing Visual Correspondence", Proceedings of the Third European Conference on Computer Vision (vol. II), ECCV '94, 1994, pp. 1-8.
Zhang et al., "Rapid Shape Acquisition Using Color Structured Light and Multi-pass Dynamic Programming", IEEE International Symposium on 3D Data Processing, Visualization, and Transmission, Jun. 2002, pp. 1-13.
International Search Report and Written Opinion for PCT Application No. PCT/US2019/065965, dated Feb. 26, 2020, 14 pages.
Nover et al.; "Espresso: Efficient Slanted Patchmatch for Real-Time Spacetime Stereo"; 2018 International Conference on 3D Vision; pp. 578-586.

\* cited by examiner ive stereo matching is a process that uses structured light to simplify the stereo matching problem. However, conventional active stereo matching techniques are computationally expensive, and the resolution and accuracy of these conventional systems may not meet the needs of applications requiring real-time processing and/or applications requiring a higher level of detail and accuracy.

SUMMARY

According to an aspect, a real-time active stereo system includes a capture system configured to capture stereo image data, where the image data includes a plurality of pairs of a reference image and a secondary image, and each pair of the plurality of pairs relates a different temporal window. The real-time active stereo system includes a depth sensing computing system including at least one processor and a non-transitory computer-readable medium having executable instructions that when executed by the at least one processor are configured to execute a local stereo reconstruction algorithm configured to compute (e.g., pre-compute) spacetime descriptors from the plurality of pairs of the stereo image data and generate depth maps based on the spacetime descriptors.

According to some aspects, the real-time active stereo system may include one or more of the following features (or any combination thereof). The capture system may include one or more projectors configured to project structured light for a subset of the plurality of pairs. The capture system may include a non-structured light source configured to project non-structured lighting for at least one of the plurality of pairs. The spacetime descriptors are computed over a spacetime window with a spatial extent of a predetermined size and a temporal extent of a predetermined size. The spatial extent may be 3×3 pixels, and the temporal extent may be 4 temporal windows. Each of the spacetime descriptors may include a number of pair-wise intensity comparisons in a spacetime window. The number of pair-wise intensity comparisons may include comparisons between randomly selected pixels in a same time window, and comparisons between unconstrained random pairs in different time windows. The local stereo reconstruction algorithm may be configured to divide the stereo image data into regions of a predetermined size, and iteratively sample the spacetime descriptors along a plurality of slanted plane hypotheses for each of the regions. Each of the regions may be a rectangle tile of a same size. The local stereo reconstruction algorithm may be configured to compute costs of disagreement between the spacetime descriptors. The local stereo reconstruction algorithm may be configured to filter the costs of disagreement using an edge-aware filter.

According to an aspect, a method for real-time active stereo includes capturing, by a capture system, stereo image data, the image data including a plurality of pairs of a reference image and a secondary image, where each pair of the plurality of pairs relates a different temporal window. The method includes executing, by a depth sensing computing system, a local stereo reconstruction algorithm that generates depth maps based on the stereo image data. The executing includes computing (e.g., pre-computing) spacetime descriptors from the plurality of pairs of the stereo image data, dividing the stereo image data into regions of a predetermined size, and iteratively sampling the spacetime descriptors along a plurality of slanted plane hypotheses for each of the regions. According to a further aspect, a method for real-time active stereo is provided which may be performed using a real-time active stereo system according to at least one aspect of the invention.

According to some aspects, the method may include one or more of the above/below features (or any combination thereof). The capturing may include projecting first patterned lighting for a first pair of the plurality of pairs, projecting second patterned lighting for a second pair of the plurality of pairs, and projecting non-patterned lighting for a third pair of the plurality of pairs. The spacetime descriptors are not re-computed during the iteratively sampling step. Each of the spacetime descriptors includes a number of pair-wise intensity comparisons in a spacetime window. The executing may include computing costs of disagreement between the spacetime descriptors using Hamming distance between the spacetime descriptors and filtering the costs of disagreement using an edge-aware filter.

According to an aspect, a non-transitory computer-readable medium storing executable instructions that when executed by at least one processor are configured to cause the at least one processor to receive stereo image data, where the stereo image data includes a plurality of pairs of a reference image and a secondary image, and each pair of the plurality of pairs relates a different temporal window, and execute a local stereo reconstruction algorithm configured to generate depth maps in real-time based on the stereo image data, including compute spacetime descriptors over a pre-defined spacetime window, divide the stereo image data into regions of a predetermined size, and evaluate a plurality of slanted plane hypotheses for each of the regions using the spacetime descriptors. According to a further aspect, a non-transitory computer-readable medium is provided which stores executable instructions that when executed by at least one processor (comprising or associated with a capture system and a depth sensing computing system) are configured to cause the at least one processor to perform a method for real-time active stereo according to at least one aspect of the invention.

According to some aspects, the non-transitory computer-readable medium may include any of the above/below features (or any combination thereof). The pre-defined spacetime window has a spatial extent and a temporal extent, and the temporal extent of the pre-defined spacetime window is less than a temporal extent of the stereo image data. Each of the spacetime descriptors includes a number of pair-wise intensity comparisons in the spacetime window. The plurality of slanted plane hypotheses for multiple regions may be evaluated at least partially in parallel.

DETAILED DESCRIPTION

Figure 1:
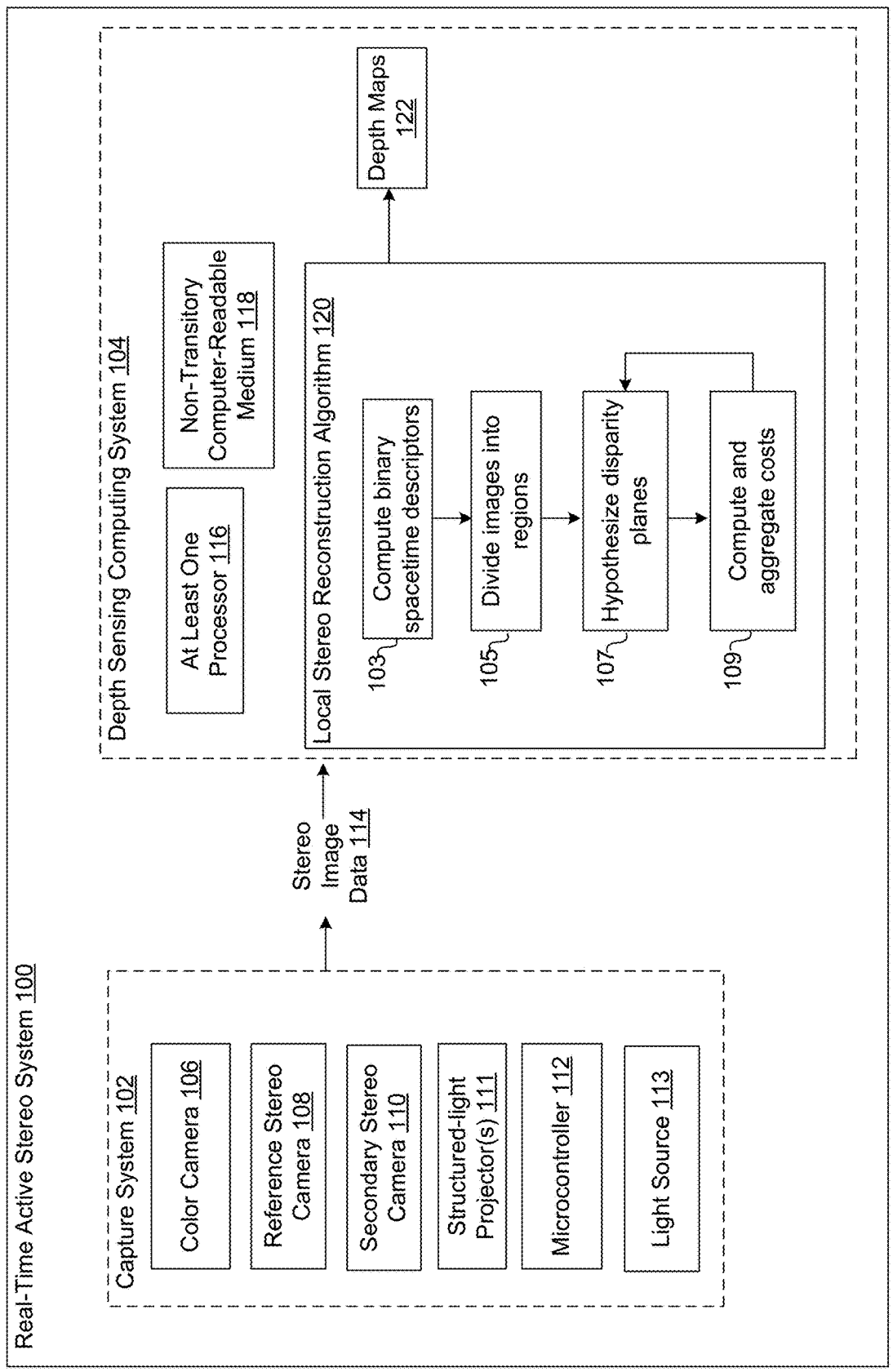
FIG. 1 illustrates a real-time active stereo system according to an aspect.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

The embodiments discussed herein provide a real-time active stereo system that captures stereo image data (having stereo images across a number of temporal exposures) and executes a local stereo reconstruction algorithm configured to compute spacetime descriptors from the stereo image data within a relatively small spacetime window and then generate depth maps based on the spacetime descriptors. In some examples, the local stereo reconstruction algorithm is configured to divide the stereo image data into regions (or tiles of a predetermined size), evaluate a plurality of slanted plane hypotheses for each of the regions using the spacetime descriptors and update the disparity values for the depth maps based on the results of the evaluation. In some examples, the evaluation includes computing costs of disagreement between the spacetime descriptors and then filtering those costs using an edge-aware filter such that the slanted plane with the lowest cost for a subset of pixels within the tile (or a cost below a threshold level) is selected for that subset of pixels.

In some examples, a spacetime descriptor may include pixel illumination patterns. In some examples, a spacetime descriptor may include pixel comparison information. In some examples, a spacetime descriptor includes information used for stereo matching and/or to estimate depth information from at least two stereo images. In some examples, a spacetime descriptor may include pixel comparison information over a spacetime window. In some examples, the spacetime window has a spatial extent of a predetermined size and a temporal extent of a predetermined size. In some examples, the spatial extent is within a range of 2×2 pixels to 8×8 pixels and the temporal extent is within a range of 2 to 6 temporal windows (e.g., 2 to 6 temporally-spaced images). In some examples, a spacetime descriptor may include a set of binary values, where each value represents a result of a pixel comparison. A pixel comparison may be the result of comparing the intensity of a first pixel with the intensity of a second pixel in a same image portion (e.g., the first pixel and the second pixel are in the same image) or across different image portions captured at different times (e.g., the first pixel is in a first image portion captured at time A, the second pixel is in a second image portion captured at time B). In some examples, the spacetime descriptors are "precomputed", which may refer to the operation of computing the spacetime descriptors before other operations of the local stereo reconstruction algorithm such as dividing the images into regions, hypothesizing disparity planes and computing and aggregating costs. In some examples, the spacetime descriptors are computed once in a pre-processing step (and are not re-computed during a plane evaluation loop).

In some examples, the local stereo reconstruction algorithm is configured to compute subpixel-shifted spacetime descriptors and to iteratively sample those descriptors along slanted disparity plane hypotheses, including applying an edge-aware filter for spatial cost aggregation. The spacetime descriptors may combine the benefits of small spatial extent with robustness to scene motion. In some examples, the algorithm performs matching across short five-frame temporal windows using structured lighting for four stereo frames, and non-structured lighting for one stereo frame that is used for edge-aware cost filtering. In some examples, the spacetime descriptor is engineered around this five-pair configuration to balance spatial compactness with robustness to motion.

The technical advantages of using spacetime descriptors (e.g., illumination patterns) are higher accuracy, which may be caused by spatially compact spacetime descriptors and cost aggregation over smaller spatial windows. Also, the spacetime descriptors discussed herein are resistant (e.g., highly resistant) to edge fattening artifacts, and enable the use of nearest-neighbor lookup on slanted disparity planes. In some examples, the costs of temporal aggregation and descriptor computation are incurred only once in a precomputation step, and the algorithm computes depth data even for oblique surfaces and near depth discontinuities (e.g., some conventional methods discard pixels). The technical solution includes a refactoring of stereo using descriptor precomputation with slanted plane cost aggregation, a spacetime binary descriptor that is robust to both scene motion and slanted (e.g., highly slanted) disparity planes, and a relatively fast edge-aware filter for slanted plane cost filtering. These technical features may enable the implementation of real-time spacetime stereo.

FIG. 1 illustrates a real-time active stereo system 100 according to an aspect. The real-time active stereo system 100 is configured to generate depth maps 122 based on captured stereo image data 114 in real-time (or near real-time) and generate 3D stereo images frames to be shown on a display device. A depth map 122 includes, for each image element of a stereo image, a disparity value. The disparity value is inversely related to the distance from a camera viewpoint to the surface of an object in the scene. For example, the depth map 122 may be used to describe an image that contains information relating to the distance from a camera viewpoint to the surface of an object in the scene.

The depth maps 122 may be used to control augmented reality, robotics, natural user interface technology, gaming, or other applications. The real-time active stereo system 100 may construct high-resolution, accurate, 3D models in real-time at a relatively high frame rate. In some examples, the real-time active stereo system 100 is a depth sensing system that can process moving scenes and generate dense, high quality depth maps 122. In some examples, the real-time active stereo system 100 generates dense, high quality depth maps 122 at 1 megapixel (or greater than 1 megapixel) at over 60 HZ.

The real-time active stereo system 100 includes a capture system 102 configured to capture stereo image data 114, and a depth sensing computing system 104 configured to obtain the depth maps 122 based on the stereo image data 114. The depth sensing computing system 104 includes at least one processor 116 and a non-transitory computer-readable medium 118 that stores executable instructions, that when executed by the at least one processor 116, is configured to execute a local stereo reconstruction algorithm 120. In some examples, the captured stereo image data 114 includes a set of images captured by the capture system 102, and the local stereo reconstruction algorithm 120 is configured to process the set of images to obtain the depth maps 122, which can be used to output re-projected image data according to a new point of view. Also, the local stereo reconstruction algorithm 120 is configured to output masks, and per-pixel surface orientation estimation.

The capture system 102 includes a color camera 106, a reference stereo camera 108, a secondary stereo camera 110, one or more structured light projectors 111, a microcontroller 112, and a light source 113 configured to project non-structured light. In some examples, the light source 113 is a near-infrared (NIR) floodlight. In some examples, the reference stereo camera 108 is considered a right camera, and the secondary stereo camera 110 is considered a left camera. The projectors 111 are configured to produce structured lighting during the stereo exposures (e.g., stereo images captured by the reference stereo camera 108 and the secondary stereo camera 110). In some examples, the projectors 111 are infrared (IR) projectors configured to project IR dot patterns. The microcontroller 112 is configured to trigger the color camera 106, the reference stereo camera 108, the secondary stereo camera 110, and the structured light projectors 111. In some examples, the microcontroller 112 is a triggering microcontroller.

In some examples, the projectors 111 include one or more banks of near-infrared (NIR) diffractive optical elements (DOEs) that project time-varying active illumination patterns. In some examples, the projectors 111 include two banks of DOEs. In some examples, each bank includes a set of DOEs. In some examples, the set of DOEs include four DOEs, and each pattern image is illuminated by one DOE from each bank. Triggering two DOEs at a time may increase the density of the projected dot pattern, which can improve the depth accuracy and coverage. In some examples, during the guide image exposure, the DOEs are turned off and an image is captured with ambient NIR illumination, provided by the light source 113.

Figure 2:
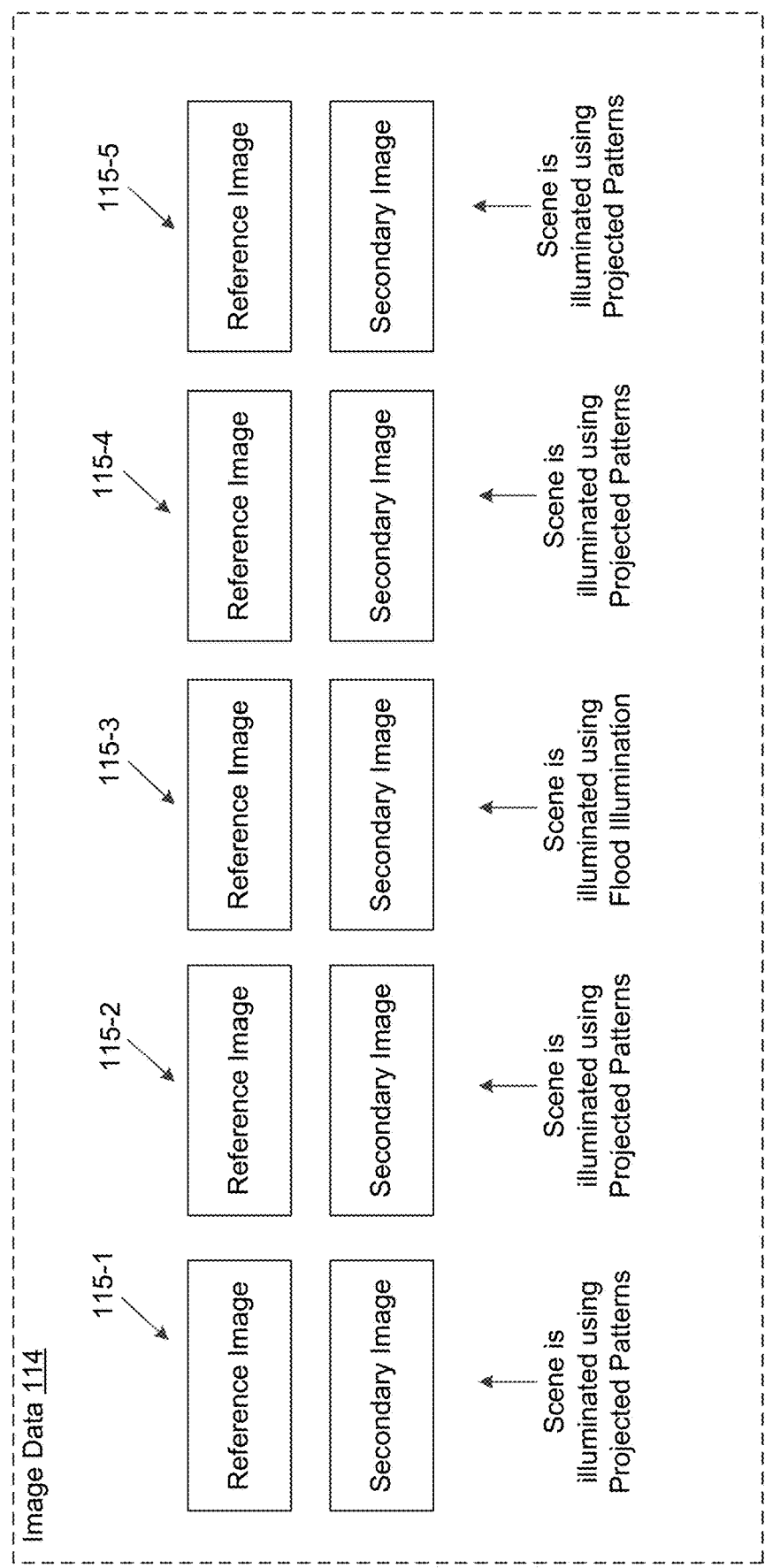
FIG. 2 illustrates an example of stereo image data received by a depth sensing computing system of the real-time active stereo system according to an aspect.

FIG. 2 illustrates an example of the stereo image data 114 received by the depth sensing computing system 104. For example, the local stereo reconstruction algorithm 120 is configured to process images in groups of a predetermined number. In some examples, the local stereo reconstruction algorithm 120 is configured to process images in sets of ten. In some examples, the local stereo reconstruction algorithm 120 is configured to process images in sets of less than ten. In some examples, the local stereo reconstruction algorithm 120 is configured to process images in sets of greater than ten. In some examples, a signal set includes five synchronized pairs. For example, a pair of synchronized images includes a reference image captured by the reference stereo camera 108 and a secondary image captured by the secondary stereo camera 110. As shown in FIG. 2, the stereo image data 114 includes a first pair 115-1, a second pair 115-2, a third pair 115-3, and a fourth pair 115-4, and a fifth pair 115-5, where each of the pairs corresponds to a different temporal window (or time frame or exposure).

During the first two and last two exposures, the scene is illuminated using high-frequency projected patterns (provided by the projectors 111), and during the middle exposure (e.g., the third pair 115-3), the scene is illuminated by non-patterned lighting (e.g., flood illumination provided by the light source 113). In some examples, the dot patterns produced during the first two and last two exposures are different from each other. In some examples, one or more of the dot patterns produced during the first two and last two exposures are the same. During the first exposure, the microcontroller 112 is configured to trigger at least one of the projectors 111 to produce dot-pattern lighting to illuminate the scene, and the microcontroller 112 is configured to trigger the reference stereo camera 108 and the secondary stereo camera 110 to capture the reference image and the secondary image, respectively, of the first pair 115-1.

During the second exposure, the microcontroller 112 is configured to trigger at least one of the projectors 111 to produce dot-pattern lighting to illuminate the scene, and the microcontroller 112 is configured to trigger the reference stereo camera 108 and the secondary stereo camera 110 to capture the reference image and the secondary image, respectively, of the second pair 115-2. During the third exposure, the scene is illuminated by the light source 113, and the microcontroller 112 is configured to trigger the reference stereo camera 108 and the secondary stereo camera 110 to capture the reference image and the secondary image, respectively, of the third pair 115-3. In some examples, during the third exposure, the microcontroller 112 is configured to trigger the color camera 106 to obtain a color image. In some examples, the reference image and the secondary image of the third pair 115-3 are not patterned images because the scene was illuminated by the light source 113. In some examples, the third pair 115-3 is considered a middle pair containing a guide image that is used for filtering the costs of disagreements using the edge-aware filter. In some examples, the guide image corresponds to the stereo image captured by the reference stereo camera 108.

During the fourth exposure, the microcontroller 112 is configured to trigger at least one of the projectors 111 to produce dot-pattern lighting to illuminate the scene, and the microcontroller 112 is configured to trigger the reference stereo camera 108 and the secondary stereo camera 110 to capture the reference image and the secondary image, respectively, of the fourth pair 115-4. During the fifth exposure, the microcontroller 112 is configured to trigger at least one of the projectors 111 to produce dot-pattern lighting to illuminate the scene, and the microcontroller 112 is configured to trigger the reference stereo camera 108 and the secondary stereo camera 110 to capture the reference image and the secondary image, respectively, of the fifth pair 115-5.

In some examples, a stack of reference images may refer to the reference images of the first pair 115-1, the second pair 115-2, the third pair 115-3, the fourth pair 115-4, and the fifth pair 115-5. In some examples, a stack of patterned reference images may refer to the reference images of the first pair 115-1, the second pair 115-2, the fourth pair 115-4, and the fifth pair 115-5. In some examples, a stack of secondary images may refer to the secondary images of the first pair 115-1, the second pair 115-2, the third pair 115-3, the fourth pair 115-4, and the fifth pair 115-5. In some examples, a stack of patterned secondary images may refer to the secondary images of the first pair 115-1, the second pair 115-2, the fourth pair 115-4, and the fifth pair 115-5.

The local stereo reconstruction algorithm 120 is configured to process the set of images of the stereo image data 114 to obtain the depth maps 122. For example, in operation 103, the local stereo reconstruction algorithm 120 is configured to compute binary spacetime descriptors based on the stereo image data 114. In some examples, only the patterned images are used for the computation of the binary spacetime descriptors (e.g., the first pair 115-1, the second pair 115-2, the fourth pair 115-4, and the fifth pair 115-5). In some examples, the third pair 115-3 is not used for the computation of the spacetime descriptors, but at least one of the images from the third pair 115-3 is used in the cost filtering (as described below). In some examples, only the reference image from the third pair 115-3 is used in the cost filtering because the secondary image is not pixel-aligned to the cost volume. The spacetime descriptors are computed for the reference images of the set (e.g., referred to as reference spacetime descriptors), and are computed for the secondary images of the set (e.g., referred to as secondary spacetime descriptors). In some examples, for improved accuracy, the local stereo reconstruction algorithm 120 is configured to shift the secondary images of the set by subpixel offsets and compute the secondary spacetime descriptors on those shifted images as well.

Figure 3:
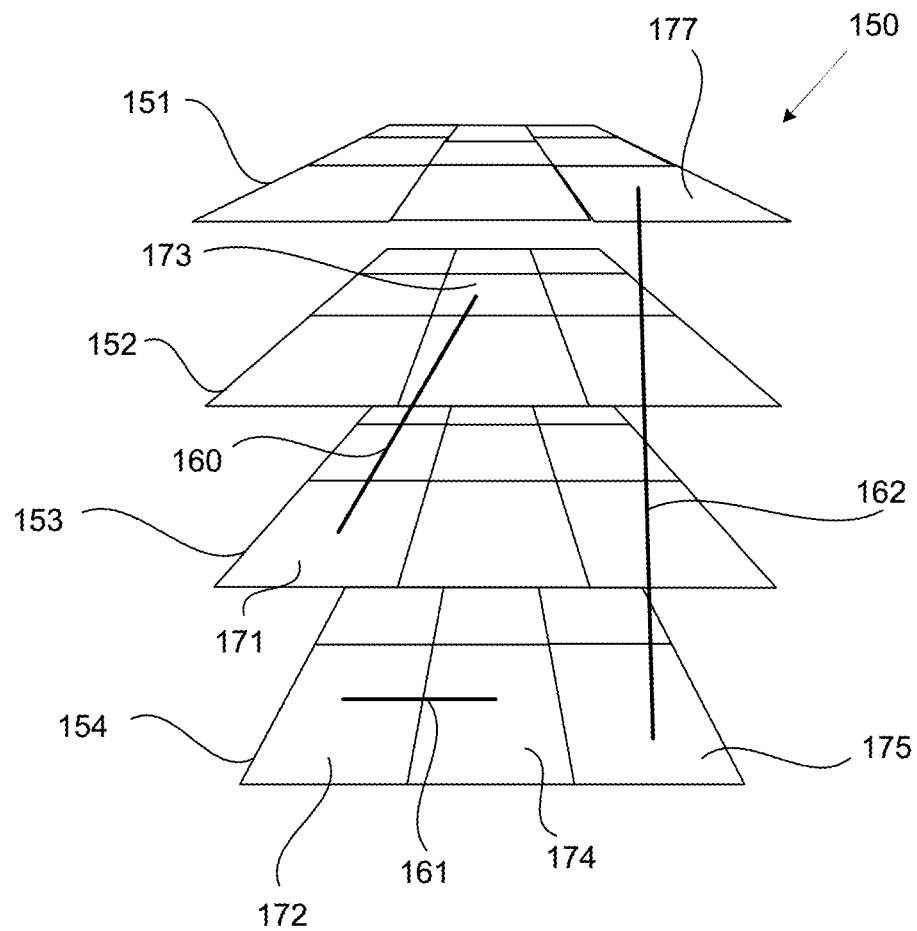
FIG. 3 illustrates a graphical representation of the computation of binary spacetime descriptors according to an aspect.

FIG. 3 illustrates a graphical representation of the computation of binary spacetime descriptors according to an aspect. For example, as shown in FIG. 3, a stack of image portions 150 within a spacetime window includes a first image portion 151, a second image portion 152, a third image portion 153, and a fourth image portion 154, and each of the image portions are captured from a different time window. Each of the image portions 150 includes a plurality of pixels, each having a pixel intensity value. Pixels in the same image portion are considered in the same time slice (or same time window), and different image portions are from different time slices (or different time windows). These four image portions may correspond to either the stack of patterned reference images or the stack of patterned secondary images as explained above with reference to FIG. 2.

The computation of binary spacetime descriptors are computed over a relatively small spacetime window. For example, the binary spacetime descriptors are computed over a spacetime window with a spatial extent of a predetermined size and a temporal extent of a predetermined size. In some examples, as shown in FIG. 3, the spatial extent is 3×3 pixels, and the temporal extent is 4 temporal windows. In some examples, the spatial extent is less than 8×8 pixels, and the temporal extent is less than 4 temporal windows. In some examples, the spatial extent is equal to or greater than 8×8 pixels, and the temporal extent is greater than 4 temporal windows. In some examples, the spatial extent is within a range of 2×2 pixels to 8×8 pixels and the temporal extent is within a range of 2 to 6 temporal windows. Also, as indicated above, a different random-dot illumination pattern is projected during each of the exposures, and the guide image with flood illumination is not used in the computation of binary spacetime descriptors but will be used for filtering. The spatial compactness of the binary spacetime descriptors may provide increased robustness to oblique geometry and depth discontinuities.

In some examples, a spacetime descriptor includes binary computer data that represents comparisons of pixels within the spacetime of the stack of image portions 150. In some examples, each of the spacetime descriptors includes a concatenation of a number of pair-wise intensity comparisons in the pre-defined spacetime window. In some examples, each of the binary spacetime descriptors includes a 32-bit binary descriptor that represents 32 pair-wise intensity comparisons in the pre-defined spacetime window.

Referring to FIG. 3, line 160 represents a comparison between pixel 171 in the third image portion 153 and pixel 173 in the second image portion 152, and if the intensity value of the pixel 171 is greater than the intensity value of the pixel 173, the result may be 1 (or 0), or if the intensity value of the pixel 171 is less than the intensity value of the pixel 173, the result may be 0 (or 1). Line 161 represents a comparison between pixel 172 in the fourth image portion 154 and pixel 174 in the fourth image portion 154, and line 162 represents a comparison between pixel 175 in the fourth image portion 154 and pixel 177 in the first image portion 151. In some examples, the binary spacetime descriptor would include a concatenation of 32 pair-wise intensity comparisons (e.g., 0, 1, 1, 0 . . . 1) over this spacetime window. Then, another binary spacetime descriptor would be computed over a different spacetime window. It is noted that spacetime windows are overlapping in both time and space, thus the windows are different but not necessarily distinct because the same pixel may be contained in many windows.

In some examples, for a particular binary spacetime descriptor, the number of pair-wise intensity comparisons include i) comparisons between randomly selected pixels in a same time slice, and ii) comparisons between unconstrained random pairs in the spacetime window. For example, the comparisons between randomly selected pixels in the same time slice would include pixel comparisons within the same image portion (e.g., line 161), and the comparisons between unconstrained random pairs in the spacetime window would include pixel comparisons across time slices (e.g., line 160, line 162). In some examples, for a particular binary spacetime descriptor, one half of the bits are from i) comparisons between randomly selected pixels in the same time slice, and the other half of the bits are from ii) comparisons between unconstrained random pairs in the spacetime window (e.g., split half and half). In some examples, the comparisons between pixels in the same time slice are fewer than the comparisons between pixels across different time slices. In some examples, the comparisons between pixels in the same time slice are greater than the comparisons between pixels across different time slices.

The binary spacetime descriptors include the reference spacetime descriptors that are computed from the stack of patterned reference images and the secondary spacetime descriptors that are computed from the stack of patterned secondary images. In some examples, the subpixel-shifted secondary spacetime descriptors are interleaved to create a lookup table of binary spacetime descriptors for every point in the disparity space. At plane evaluation time (as discussed below), each pixel's proposed disparity is used to perform a nearest-neighbor lookup into this table.

Referring back to FIG. 1, after the binary spacetime descriptors are computed, in operation 105, the local stereo reconstruction algorithm 120 is configured to divide the set of images of the image data 114 into regions of a predetermined size. It is noted that the regions may be referred to as tiles. In some examples, the regions are rectangular tiles having the same size. In some examples, the images are split into independent output regions of a predetermined size (e.g., 32×28), with overlapping input regions of a predetermined size (e.g., 36×32). Then, the local stereo reconstruction algorithm 120 is configured to process the regions using the binary spacetime descriptors to obtain the depth maps 122. In some examples, the local stereo reconstruction algorithm 120 is configured to process the regions in parallel.

The local stereo reconstruction algorithm 120 is configured to iterate between i) hypothesizing disparity planes (operation 107) for all tiles and ii) computing and aggregating costs (operation 109) in parallel over each tile. The disparity planes may be slanted (or tilted) plane hypotheses. Operation 107 and operation 109 may be considered a plane evaluation loop that implements real-time spacetime stereo matching using slanted (or titled) plane guesses at each region of the space-time window (e.g., four IR frames, and a fifth guide image frame), computing costs of disagreement based on Hamming distances between the binary spacetime descriptors and aggregating (filtering) the costs of disagreement using an edge-aware filter. In some examples, the edge-aware filter is a permeability filter.

The slanted plane hypothesis for a region having the lowest aggregated cost (e.g., or a cost below a threshold level) may be selected as a potential match for some pixels in a given iteration. It is noted that the plane hypotheses are shared across regions, but each pixel in a particular region is selected with a best-fit slanted plane hypothesis. The Hamming distance between two binary spacetime descriptors is the number of differences between the bits of a reference binary spacetime descriptor and the bits of a secondary binary spacetime descriptor. In other words, a number of slanted planes are tested for each region by aggregating and filtering Hamming distances between the precomputed binary spacetime descriptors, and the slanted plane hypothesis having the lowest cost (or a cost below a threshold level) is selected as a potential match for a particular pixel.

Then, the local stereo reconstruction algorithm 120 may repeat this iteration by returning to operation 107 to generate new slanted plane hypotheses based on the results of operation 109. For example, the local stereo reconstruction algorithm 120 may generate new slanted plane hypotheses by modifying the potential matches from the results of operation 109 or copying slanted plane hypotheses from pixels in neighboring tiles, and then testing the new slanted plane hypotheses by aggregating and filtering the Hamming distances between the precomputed binary spacetime descriptors.

Figure 4:
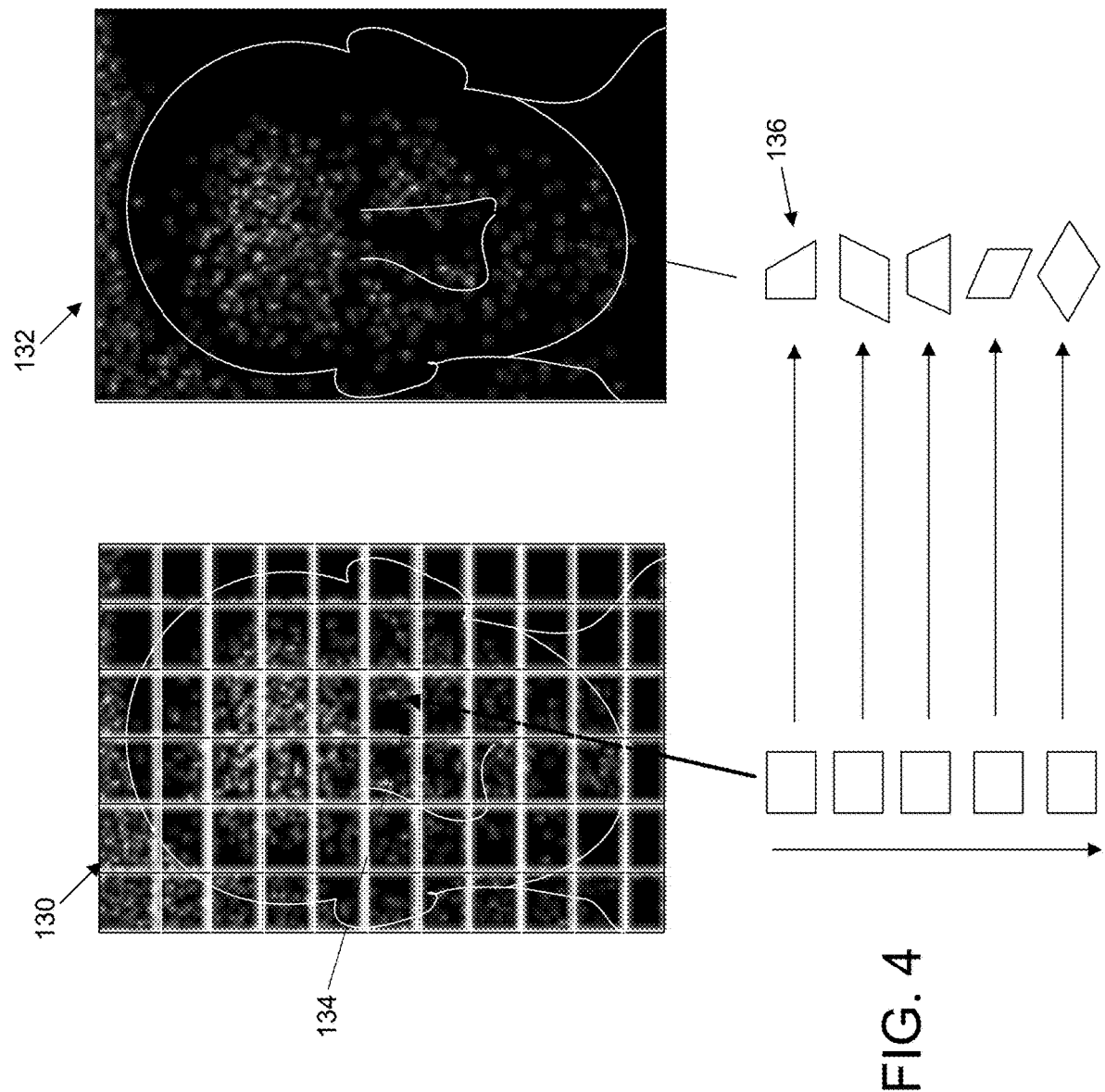
FIG. 4 illustrates a graphical representation of evaluating slanted plane hypotheses according to an aspect.

In further detail, the local stereo reconstruction algorithm 120 is configured to iteratively sample the binary spacetime descriptors along a plurality of slanted plane hypotheses for each of the regions. FIG. 4 illustrates a graphical representation of evaluating slanted plane hypotheses according to an aspect. FIG. 4 illustrates a reference image 130 and a secondary image 132 for one of the pairs of images of the stereo image data 114. As shown on FIG. 4, the reference image 130 is divided into regions 134. The local stereo reconstruction algorithm 120 is configured to find matches in the secondary image 132 to a given region in the reference image 130 by evaluating a number of slanted plane hypotheses 136 against the corresponding region in the secondary image 132. In other words, for each region 134, the local stereo reconstruction algorithm 120 determines a plurality of slanted plane hypotheses 136 to guess and then evaluates those slanted plane hypotheses 136 against the region 134. In some examples, the local stereo reconstruction algorithm 120 is configured to evaluate multiple slanted plane hypotheses 136 in parallel over several tiles (e.g., the tiles are processed in parallel). In some examples, multiple slanted plane hypotheses for a single tile are processed in parallel.

In particular, for a particular slanted plane hypothesis, the local stereo reconstruction algorithm 120 is configured to re-sample the secondary binary spacetime descriptors for the region along the slanted plane hypothesis. For example, the slanted plane hypothesis provides a disparity per pixel, which is used to resample the nearest neighbor secondary binary spacetime descriptor. The local stereo reconstruction algorithm 120 is configured to compute the cost of disagreement between the re-sampled secondary binary spacetime descriptors in the region of the secondary image 132 and the reference binary spacetime descriptors in the corresponding region 134 of the reference image 130 by computing the Hemming distances between the re-sampled secondary binary spacetime descriptors and the reference binary spacetime descriptors in that region.

Then, the local stereo reconstruction algorithm 120 is configured to aggregate (for filter) the costs of disagreement using the edge-aware filter and the guide image (e.g., reference image of the third pair 115-3) to compensate for regions with low signal, which is further described later in the disclosure. In some examples, the edge-aware filter is a permeability filter. In some examples, the edge-aware filter is a bilateral filter. In some examples, the edge-aware filter is a guided filter. The edge-aware filter is used to regularize noisy cost values in low-contrast regions of the guide image while retaining high-frequency details in high-contrast image regions of the guide image, which may correspond to depth edges in the scene. More generally, even with space time patterns, at any given pixel, there may not be a unique match, but it may be likely that nearby pixels should match to nearby points in the other image. The edge-aware filter uses the guide image to combine data at locations apart from the edges.

Some conventional algorithms use a plane evaluation method that re-sample based on the evaluated plane, and then the descriptors are re-sampled and re-computed, which is computationally expensive. However, the local stereo reconstruction algorithm 120 does not re-sample the original image or re-compute the descriptors from the re-sampled image. Rather, the binary spacetime descriptors are computed once in the preprocessing operation (e.g., operation 103), and the binary spacetime descriptors are not recomputed during the plane evaluation loop (e.g., operation 107 and operation 109). For example, because the binary spacetime descriptors are relatively small in spacetime, the local stereo reconstruction algorithm 120 can precompute the spacetime descriptors in a processing step, thereby decreasing the amount of computer resources and increasing the speed to generate the depth maps 122. Also, due to the compactness of the spacetime descriptors, the local stereo reconstruction algorithm 120 is configured to perform a nearest neighbor sample of the spacetime descriptors, which is computationally fast.

Figure 5:
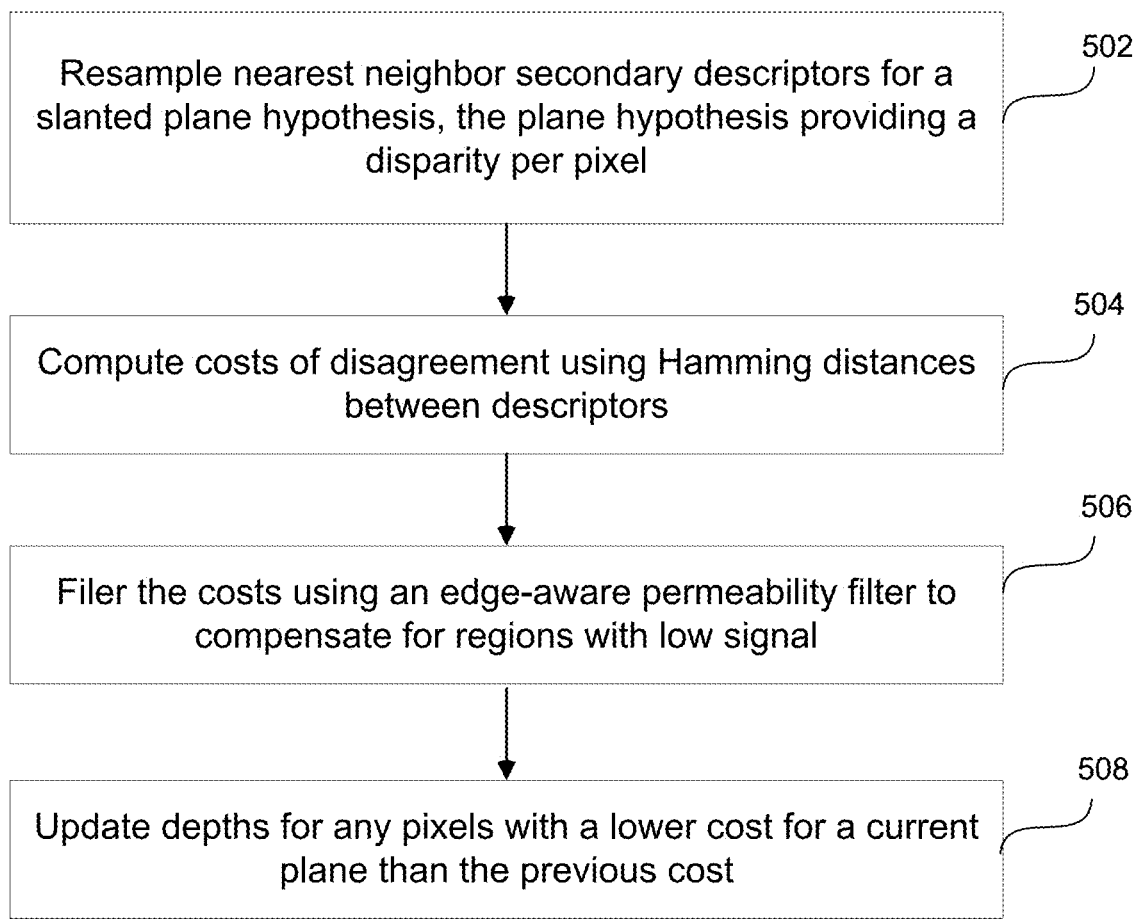
FIG. 5 illustrates sub-steps of a plane evaluation loop executable by a local stereo reconstruction algorithm of the real-time active stereo system according to an aspect.

In some examples, the plane evaluation loop includes four sub-steps. FIG. 5 illustrates a flowchart 500 depicting sub-steps of a plane evaluation loop executable by the local stereo reconstruction algorithm 120 according to an aspect. Operation 502 includes resampling nearest neighbor secondary descriptors for a slanted plane hypothesis, where the slanted plane hypothesis provides a disparity per pixel. Operation 504 includes computing costs of disagreement using Hamming distances between the spacetime descriptors. Operation 506 includes filtering the costs using the edge-ware filter to compensate for regions with low signal. Operation 508 includes updating depths for any pixels with a lower cost for a current plane than the previous cost.

Figure 6:
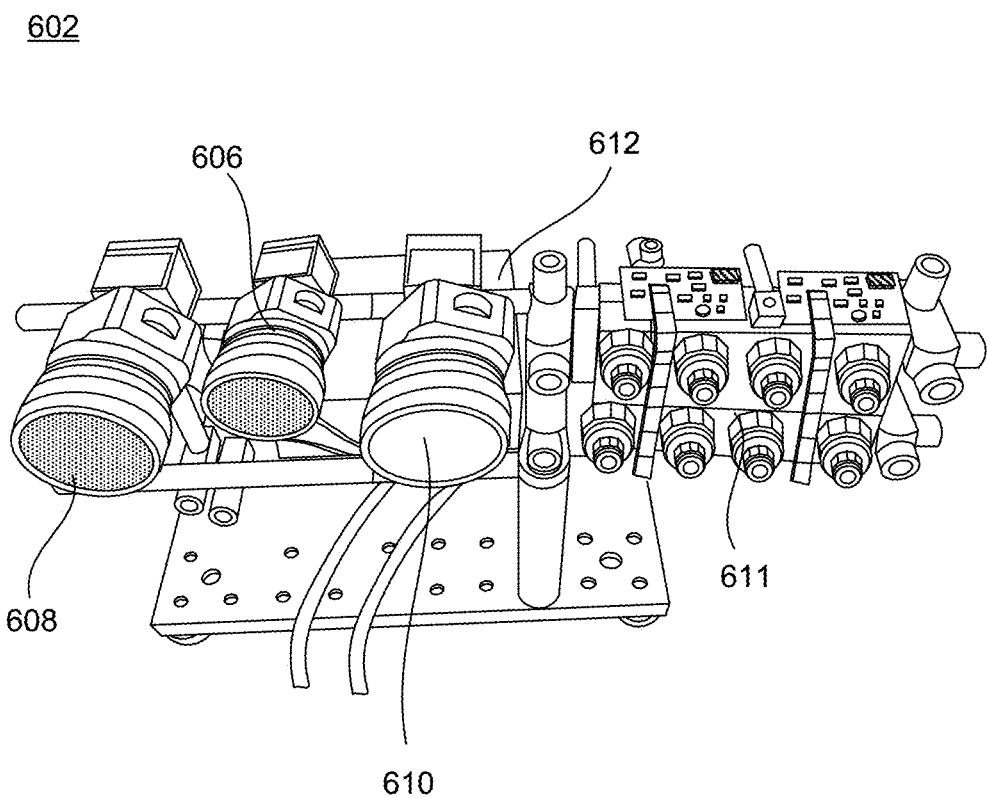
FIG. 6 illustrates an example of a capture system of the real-time active stereo system according to an aspect.

FIG. 6 illustrates an example of a capture system 602 according to an aspect. The capture system 602 includes a reference camera 608, a secondary camera 610, a microcontroller 612, a color camera 606, and IR projectors 611. In some examples, the reference camera 608 and the secondary camera 610 includes a pair of cameras fitted with lenses and near-infrared (NIR) pass filters. In some examples, the IR projectors 611 include two banks of NIR diffractive optical elements (DOEs) project time-varying active illumination patterns. Each bank consists of four DOEs, and each patterned image is illuminated by one DOE from each bank. Triggering two DOEs at a time increases the density of the projected dot pattern, which may improve depth accuracy and coverage. During the guide image exposure, the DOEs are turned off and an image is captured with ambient NIR illumination, provided by an un-triggered NIR floodlight. The cameras and DOEs are triggered by the microcontroller 612.

Figure 7:
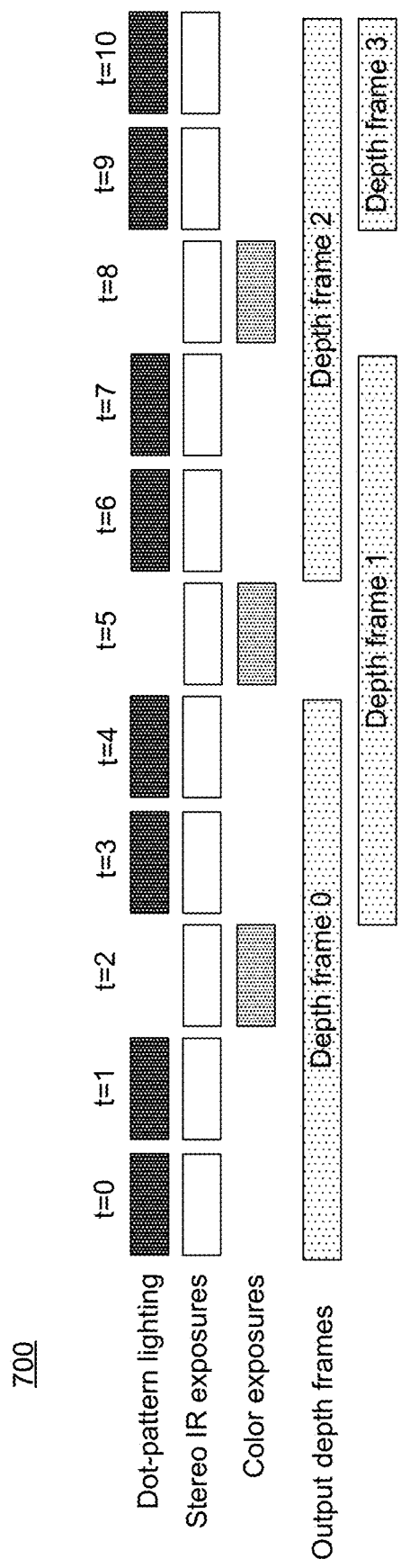
FIG. 7 illustrates a timing diagram for the stereo images in a repeating pattern-pattern-guide sequence according to an aspect.

FIG. 7 illustrates a timing diagram 700 for the stereo images in a repeating pattern-pattern-guide sequence according to an aspect. In some examples, the stereo images are captured at 180 Hz in the repeating pattern-pattern-guide sequence. Each stereo depth map is computed over a rolling window of 5 frames (4 patterned, 1 guide) centered on a guide image. If an RGB camera is used for color texturing, it is triggered synchronously with the guide image. This may ensure good alignment of depth edges with the associated texture map.

Figure 8A:
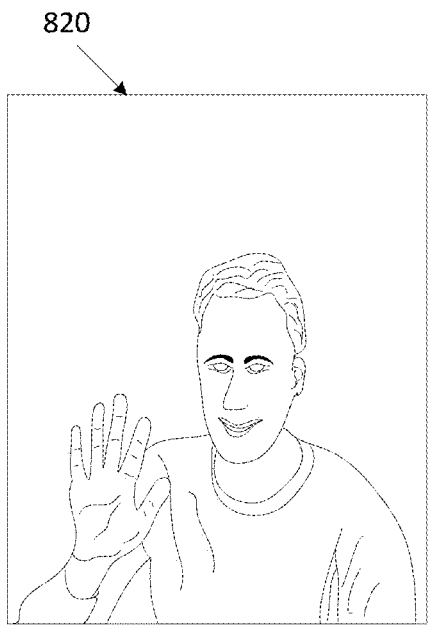
FIGS. 8A through 8D illustrate various images captured or generated by the real-time active stereo system according to an aspect.
Figure 8B:
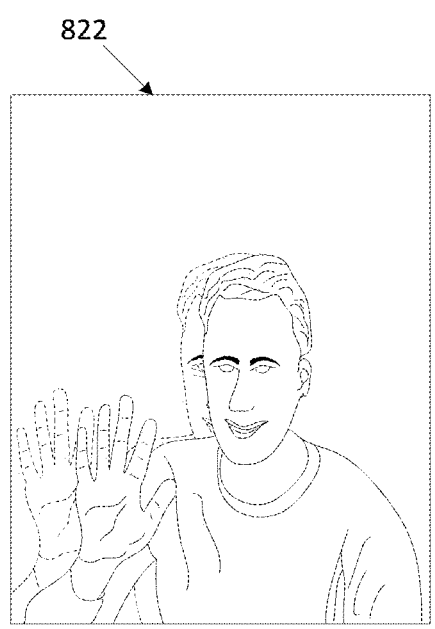
Figure 8C:
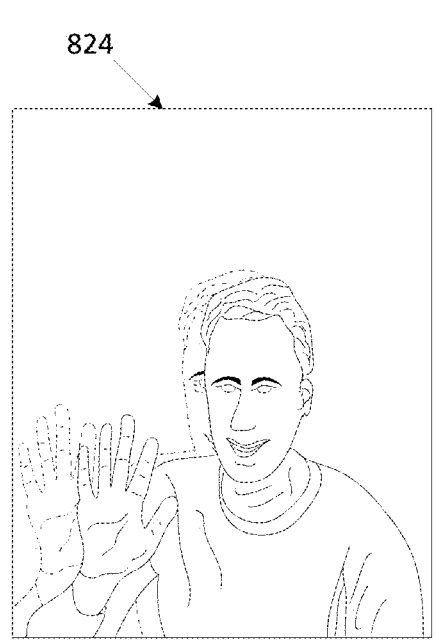
Figure 8D:
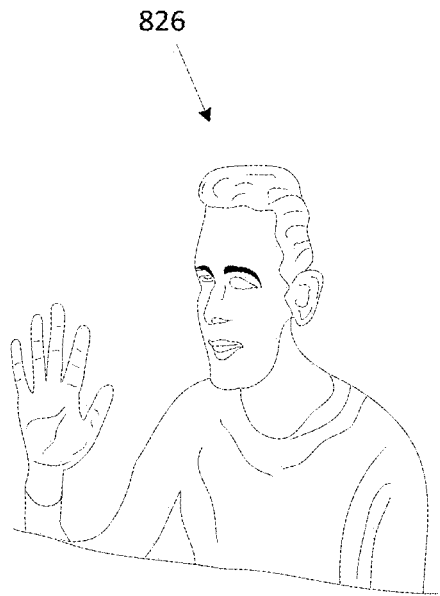

FIGS. 8A through 8D illustrate various images captured or generated by the real-time active stereo system 100. Referring to FIG. 8A, the capture system 102 may capture an image 820 (included as part of the stereo image data 114) on a moving scene. Referring to FIG. 8B, the local stereo reconstruction algorithm 120 generates a depth map 822 (e.g., a high quality depth map). Referring to FIG. 8C, the local stereo reconstruction algorithm 120 may generate an image 824 representing a per-pixel estimate of surface orientation. Referring to FIG. 8D, the real-time active stereo system 100 may output a re-projected image 826 that illustrates the accuracy of the depth map 822 when textured and re-projected from a new viewpoint.

Figure 9A:
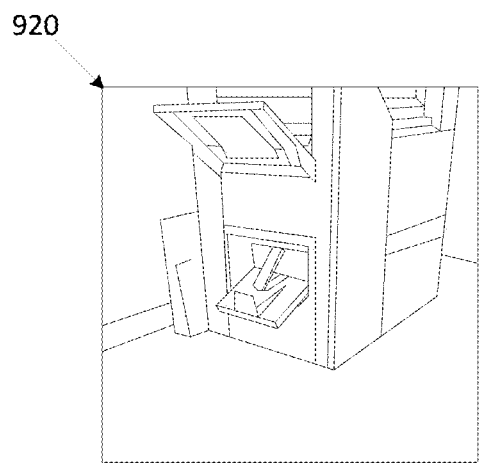
FIGS. 9A through 9E illustrate a comparison of a conventional depth sensing algorithm and the local stereo reconstruction algorithm for a stationary scene according to an aspect.
Figure 9B:
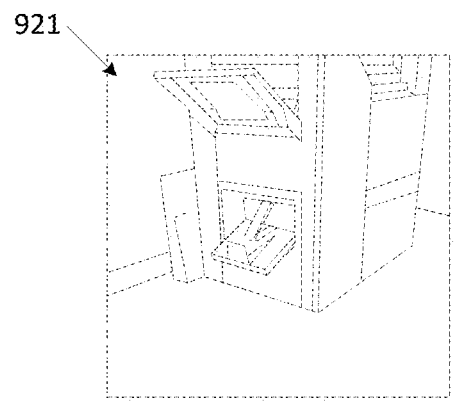
Figure 9C:
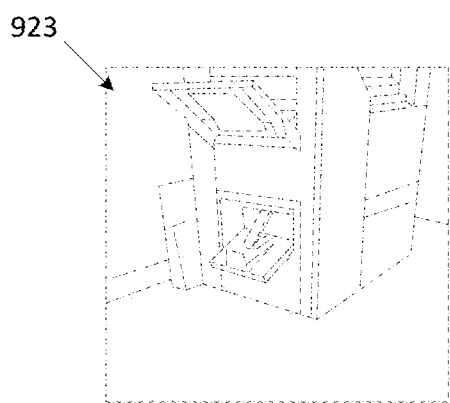
Figure 9D:
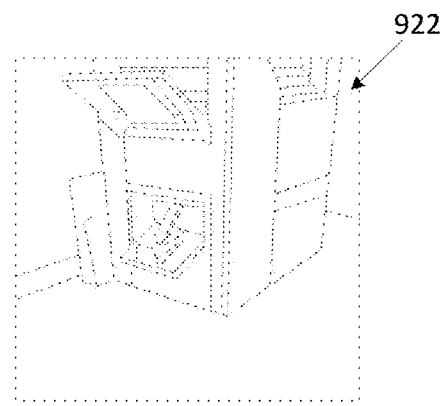
Figure 9E:
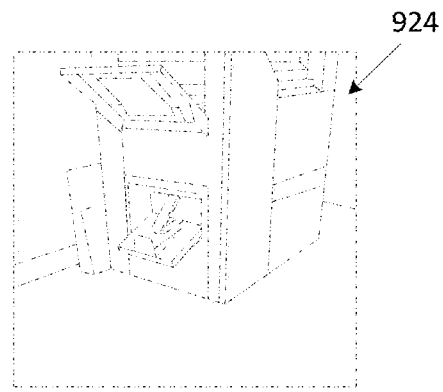

FIGS. 9A through 9E illustrate a comparison of a conventional depth sensing algorithm (e.g., shown in FIGS. 9B and 9C) and the local stereo reconstruction algorithm 120 (e.g., shown in FIGS. 9D and 9E) with respect to the quality and accuracy of the depth maps and the re-projected images for a stationary scene according to an aspect. As shown in FIG. 9A, an IR image 920 is captured by a capture system. As shown in FIGS. 9B and 9C, a conventional depth sensing algorithm produces a depth map 921 and a re-projected image 923 based on the depth map 921. As shown in FIGS. 9D and 9E, the local stereo reconstruction algorithm 120 generates a depth map 922 and a re-projected image 924. As shown in these figures, the resolution and accuracy provided by the local stereo reconstruction algorithm 120 has improved over the conventional depth sensing algorithm.

Figure 10A:
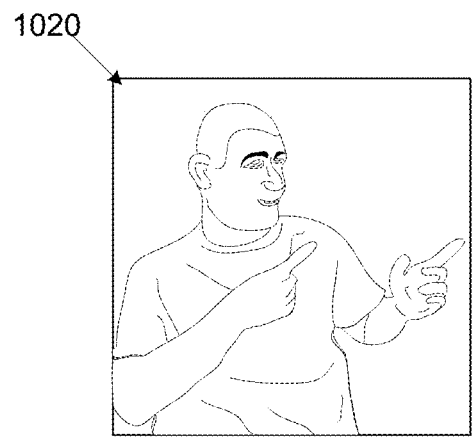
FIGS. 10A through 10E illustrate a comparison of a conventional depth sensing algorithm and the local stereo reconstruction algorithm for a moving scene according to an aspect.
Figure 10B:
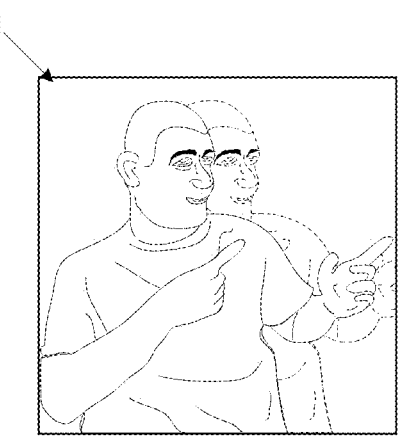
Figure 10C:
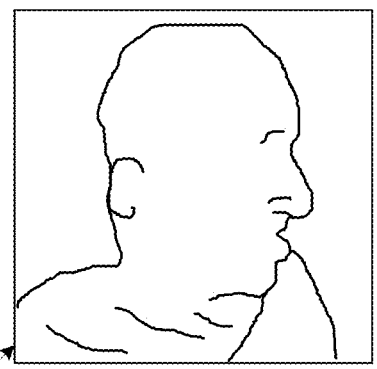
Figure 10D:
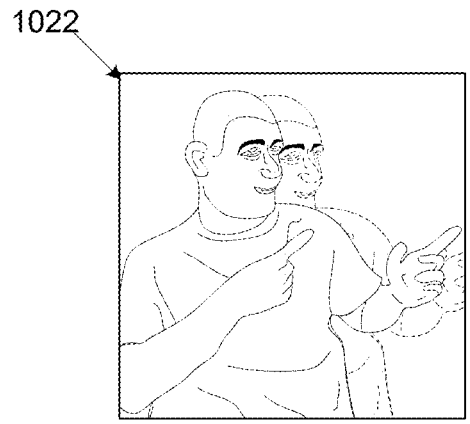
Figure 10E:
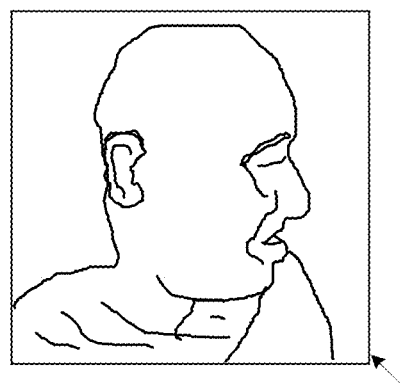

FIGS. 10A through 10E illustrate a comparison of a conventional depth sensing algorithm (e.g., shown in FIGS. 10B and 10C) and the local stereo reconstruction algorithm 120 (e.g., shown in FIGS. 10D and 10E) with respect to the quality and accuracy of the depth maps and the re-projected images for a moving scene. As shown in FIG. 10A, an IR image 1020 is captured by a capture system. As shown in FIGS. 10B and 10C, a conventional depth sensing algorithm produces a depth map 1021 and a re-projected image 1023 based on the depth map 1021. As shown in FIGS. 10D and 10E, the local stereo reconstruction algorithm 120 generates a depth map 1022 and a re-projected image 1024. As shown in these figures, the resolution and accuracy provided by the local stereo reconstruction algorithm 120 has improved over the conventional depth sensing algorithm.

Various portions of the local stereo reconstruction algorithm 120 described above are summarized in the following pseudocode:

Algorithm: Given input images $I_{ref}$, $I_{sec}$, the algorithm 120 (ESPRESSO) computes a depth map D and valid mask M. $I_{ref}$ refers to the stack of reference images, $I_{sec}$ refers to the stack of secondary images, and the depth map D is the depth map 122.

1: procedure ESPRESSO($I_{ref}$, $I_{sec}$)
2:     $\tilde{I}_{ref}$ ← RECTIFY($I_{ref}$)
3:     $B_{ref}$ ← COMPUTEDESCRIPTORS($\tilde{I}_{ref}$)
4:     For subpixel d ∈ {0, ..., $d_{max}$} do
5:     $\tilde{I}_{sec}^d$ ← $RECTIFYWITHXOFFSET\left(I_{sec}, \frac{d}{d_{max}+1}\right)$
6:     $B_{sec}^d$ ← COMPUTEDESCRIPTORS($\tilde{I}_{sec}^d$)
7:     for tile T in reference image domain do
8:        P ← INITIALIZEPLANES
9:        D ← INITIALIZEDEPTHS
10:       costs $C_{opt}$ ← ∞
11:     for n iterations do
12:       for tile T ∈ $B_{ref}$ parallel do
13:         for plane $P_i$ parallel do
14:           $B_{res}$ ← NNSAMPLE($B_{sec}$, $P_i$)
15:           C ← COMPUTECOSTS($B_{ref}$, $B_{res}$)
16:           C ← PERMEABILITYFILTER(C)
17:           D ← UPDATEDEPTHS(C, $C_{opt}$, D, $P_i$)
18:       if not final iteration then
19:         P ← UPDATEPLANES(D)
20.    M ← COMPUTEINVALID PIXELS (D)
21.    return D, M The algorithm 120 starts at line 1. At lines 2-3, the reference images (e.g., the stack of reference images) are rectified, and the reference spacetime descriptors are computed. At lines 4-6, the secondary images (e.g. the stack of secondary images) are rectified with a sub-pixel offset, and the secondary spacetime descriptors are computed. At lines 7-10, the planes (e.g., the slanted plane hypotheses) and the depths for the regions (tiles) in the reference image domain are initialed. At lines 11-12, the regions are processed in parallel to test the slanted plane hypotheses. At lines 13-17, the secondary binary spacetime descriptors are re-sampled (e.g., a nearest neighbor sample) for the region along the currently-tested slanted plane hypothesis, the costs of disagreement are computed between the re-sampled secondary binary spacetime descriptors and the reference binary spacetime descriptors, the costs of disagreement are filtered using the edge-aware permeability filter, and the depths are updated based on the slanted plane hypothesis having the lowest cost. At lines 18-19, if it is not the final iteration, planes are updated (e.g., new slanted plane hypotheses are generated to be tested again in lines 12-17). At line 20, a mask is computed by computing the invalid pixels. At line 21, the algorithm 120 returns the depth map D and the valid mask M.

The following description provides formalization and mathematical equations of the above-described local stereo reconstruction algorithm 120.

Spacetime Descriptor

One of the benefits of a spacetime descriptor is the spatial extent is similar than typical single-image descriptors. In some examples, the spacetime descriptor is computed over a spacetime window with a spatial extent of only 3×3 pixels and a temporal extent of four exposures. The spatial compactness of this descriptor may provide better robustness to oblique geometry and depth discontinuities.

The intensity at rectified pixel (x, y) during pattern t may be represented as $\tilde{I}(x, y, t)$. Then, each bit k of a binary descriptor τ(x, y, k) compares the values of two nearby pixels:

$$\tau(x,y,k)=H(\tilde{I}(x+a_k,y+c_k,t_k)-\tilde{I}(x+b_k,y+d_k,s_k)) \quad \text{Eq. (1):}$$

The function H( ) denotes the Heaviside step function. The 32-bit binary descriptor B at (x, y) is the concatenation of 32 such pair-wise intensity comparisons in the 3×3×4 spacetime volume centered at pixel (x, y), B(x, y)=(τ(x, y, 0), τ(x, y, 1), . . . , τ(x, y, 31)). This forms a family of descriptors parameterized by various choices of $a_k$, $b_k$, $c_k$, $d_k$, $t_k$, and $s_k$. The raw matching cost between two spacetime descriptors is simply the Hamming distance between them, which can be computed efficiently on a CPU or GPU.

The choice of parameters produces different performance characteristics. For example, one choice of parameters is to adapt the single-image Census and BRIEF descriptors to the spacetime case, by computing them independently for each time-slice and then concatenating the results, which may be advantageous. Since scene motion is not explicitly account for during the image capture process, movement may cause high matching costs, especially near depth discontinuities. Using within-image comparisons provides a measure of robustness to motion effects near edge discontinuities.

However, even under high frequency illumination patterns, intensity changes in nearby pixels in the same image are often highly correlated (e.g., due to defocus blur, scattering, etc.). In contrast, the time-varying illumination patterns discussed herein are uncorrelated across time, so comparisons across time ($t_k \neq s_k$) may be improve the discriminative ability of a descriptor. However, comparisons across time may be more sensitive to motion than comparisons within the same time-slice.

To combine the benefits of both types of comparisons, in some examples, the algorithm 120 adapts a hybrid scheme (e.g., breve), in which half the comparisons are between randomly selected pixels in the same time slice ($t_k=s_k$), and the rest are between unconstrained random pairs of pixels in the space-time window. Since the local stereo reconstruction algorithm 120 evaluates slanted planes, some conventional methods suggest to resample patches of the secondary images and to re-compute descriptors for every plane, as part of the plane evaluating loop. However, as explained above, performance can be improved by amortizing all image resampling and descriptor computations into a preprocess operation.

The local stereo reconstruction algorithm 120 is configured to rectify the secondary image with a small number of subpixel translation offsets—using bilinear sampling for rectification—and produce a descriptor for every patch at every offset. In some examples, fusing rectification, subpixel translations, and descriptor computation into one kernel may minimize memory traffic and avoids signal loss due to multiple sampling and reconstruction passes. The secondary spacetime descriptors are then interleaved to create a lookup table of descriptors for every point in disparity space. At plane evaluation time, each pixel's proposed disparity is used to perform a nearest-neighbor lookup into this table. This technique may be an improvement over approaches that re-compute descriptors for every plane. In some examples, the coarse sampling of subpixel disparity space may avoid spurious errors in low-signal regions, where highly oblique planes can otherwise match arbitrary patterns in image noise.

Cost Permeability Filtering

Having computed the raw costs using the Hamming distance between precomputed descriptors, the algorithm 120 is configured to aggregate costs intelligently via the edge-aware permeability filter, which is explained below.

Let $C=\mathbb{R}^{w \times h}$ be an image region to be filtered, in our case the raw costs under a given plane hypothesis. The permeability $\mu_{P,\dot{P}}$ between two adjacent pixels P and $\dot{P}$ is a number between 0 and 1 that controls the flow of information between those pixels. A high permeability allows high information flow, and thus larger support windows, while a low permeability allows less information flow, and thus smaller support windows. Permeabilities are symmetric, so $\mu_{P,\dot{P}} = \mu_{\dot{P},P}$, and are computed based on edge strength.

The edge-aware permeability filter may start by applying a simple recursion left-to-right. Let $\mu_{x,y}$ be the permeability between (x, y) and (x−1, y) and define $C^{LR(x,y)}$ as:

$$C^{LR}(x,y)=\mu_{x,y}.C^{LR}(x-1,y)+C(x,y), \quad \text{Eq. (2):}$$

where 0 is initialized at the min-x boundary base case.

Then, a right-to-left recursion is defined, noting that because of symmetry, $u_{x+1,y}$ is used as the permeability between (x, y) and (x+1, y):

$$C^{RL}(x,y)=\mu_{x+1,y}.C^{RL}(x+1,y)+C(x,y), \quad \text{Eq. (3):}$$

where 0 is used again to initial at the max-x boundary base case, and the horizontal cost filter is $C^{H}(x, y)=C^{LR}(x, y) C^{RL}(x, y)$.

If the permeabilities are defined such that they approach 1 in constant regions and approach 0 at intensity edges, this acts as a one-dimensional edge-aware filter. The two-dimensional extension of this filter then performs independent top-to-bottom and bottom-to-top passes over $C^{H}$, using permeabilities computed between vertical pairs of pixels, producing $C^{TB}$ and $C^{BT}$, respectively. The final cost is similarly defined $C=C^{BT}+C^{TB}$. The resulting weighted support windows for each output pixel mostly track edges, although compared to a more traditional and expensive bilateral or guided filter there are asymmetries. For example, the aggregation region at the center pixel of an hourglass shape is the whole hourglass if the hourglass is vertical but only a line when the hourglass is horizontal.

Computation of this filter may be inexpensive (e.g., very inexpensive). In some examples, on architectures such as a GPU where a fused multiply-and-add is the same cost as an add, it may require 6 operations per pixel. In some examples, at least 4 operations may be required for a recursive box filter, although the permeability filter also may require an additional state for intermediate values and permeability coefficients, and the computation is distributed over several passes.

The permeability weights are defined:

$$\mu_{x,y}^{LR} = e^{\frac{G(x,y)-G(x-1,y)}{\sigma}}. \qquad \text{Eq. (4)}$$

The parameter $\sigma$ is a tunable parameter determining the strength of the smoothing, and G is the linear intensity value of the guide image with flood illumination. In some examples, a small additional apron of pixels around the boundary of the tile in the filter run-up is included. Increasing the size of this apron may improve the quality of the output for edge pixels, but, in some examples, may also diminish efficiency. In some examples, the apron is a 2-pixel apron.

For efficient GPU implementation, the algorithm 120 may aggregate over fixed-size tiles independent of scene content, in contrast to one or more conventional approaches. In some examples, the tiles are aligned to maximize the usage for a target warp size of 32 threads, scheduling 32 threads for each pass across a tile. Thus, the algorithm may compute raw costs for a 36×32 pixel region in the input. In some examples, the horizontal pass produces intermediate cost buffers $C^H$ over the inner 32×32 pixels, and then the vertical pass produces aggregated costs for the inner 32×28 pixels.

Plane Hypothesis Generation

The algorithm may generate plane hypotheses iteratively using one or more of a plurality of different heuristics.

For initialization, planes may be drawn from a random distribution. Parameterizing each plane as a point and a normal in disparity space, uniform samples are drawn over the disparity range, and normals are drawn from a distribution with a frontoparallel bias. For propagation, for each tile, the current best plane sample is drawn for a random pixel in its neighboring tiles, in the four cardinal directions.

For perturbation, the algorithm 120 selects a random pixel within each tile and perturbs its current winning plane in the disparity/normal parameterization described above. The perturbations depend on a scale parameter s, where the amounts to perturb are uniformly distributed between 0 and s. To generate a family of perturbed planes, a series of geometrically decreasing scales $s_j = s_0/\alpha^j$ can be used, effectively sampling from an exponential distribution around the plane.

For Hot Start, in a real-time system running continuously, a sequence of depth images usually changes relatively slowly over time. The algorithm 120 may use the previous output depth image as an estimate for the current frame. For each tile, the winning plane is evaluated from the previous frame at a random pixel in that tile. Although that plane may no longer be a relatively good fit for that particular pixel due to scene motion—especially at moving depth discontinuities—it can still be a reasonable match for other pixels within the same tile.

For efficiency, in some examples, the algorithm 120 may evaluate planes in batches by launching a single CUDA kernel which may test 24 hypotheses per tile, over all tiles at once. In some examples, the evaluation loop alternates between generating 24 planes to test for each tile, and then testing all those planes together, updating the current winners. In some examples, the algorithm 120 may perform 16 iterations per frame, to test a total of 324 planes per tile. In the first iteration, the algorithm may generate all 24 planes via Initialization. In the second iteration, all 24 planes may be generated via the Hot Start. For the first output image in a sequence, where no previous frame is available, the second iteration randomly may initialize 24 more planes. The next 4 iterations each may include 4 planes picked via propagation—one from each cardinal direction—and 20 from perturbation. In some examples, the algorithm may start at scale $s_0=1$ and pick 2 planes at each scale, reducing the scale geometrically by $$\alpha = 2^{\frac{8}{10}}.$$

At this point, some winning planes may be assumed to be near the cost minimum. The remaining 10 iterations also choose 4 planes via propagation and 20 for perturbation, but for perturbing planes, the algorithm may start at scale $s_0=\frac{1}{8}$ in order to refine current winners, rather exploring the full space of planes.

Depth Invalidation

The algorithm 120 may determine a depth estimate for every pixel. However, some points may be occluded from the secondary stereo camera 110, some surfaces have too low albedo to be matched, and other regions have transparent or subpixel-width objects in them. As a proxy for detecting these properties, the algorithm 120 may perform three evaluations to invalidate inaccurate depth estimates. First, the algorithm 120 may reject any pixels with depth estimates outside the frustum of the secondary stereo camera 110. Second, the algorithm 120 may discard pixels with very highly oblique plane tilts such the planes can only have few pixels supporting them and are likely to be outliers. Also, the algorithm 120 may determine connected components based on a minimum disparity difference and discard entire components below a threshold number of pixels.

Experiments

Figure 11:
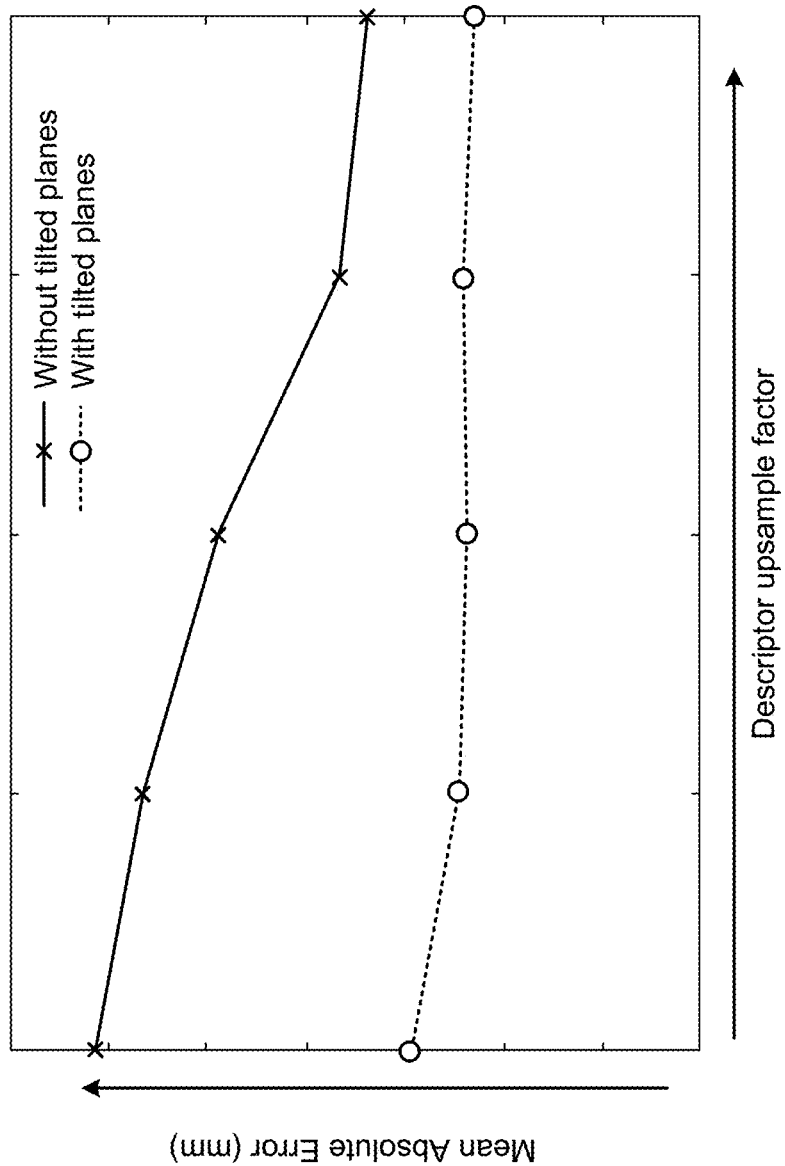
FIG. 11 illustrates a graph depicting the impact of using slanted planes according to an aspect.

To study the effect of various parameter and algorithmic choices, evaluation sequences for a moving object with known geometry was captured by the capture system 102. The algorithm 120 used an iterative closest point algorithm to compute the rigid transform that best aligns the true shape with each estimated stereo depth map 122, and computed statistics on the per-pixel alignment residuals in the sequence to quantify the accuracy of an algorithm or set of parameters. This evaluated was used to generate FIG. 11. FIG. 11 illustrates a graph 1102 depicting the impact of using slanted planes along with the effects of subpixel sampling in the precomputed descriptor lookup table according to an aspect. With slanted planes, reconstruction error is already quite low at only one sample per pixel, and there may be no improvement (or relatively small improvement) beyond two samples per pixel. Errors are higher without slanted planes, and the improvements from denser subpixel descriptor sampling may take longer to saturate.

CONCLUSION

As described above, the real-time active stereo system 100 is configured to perform real-time spacetime stereo reconstruction. The techniques described herein produces high accuracy and good coverage on highly complex real-world surfaces. In some examples, because it requires no calibrated illumination sources, multiple sensors can capture depth simultaneously without interference. In some examples, additional illumination improves accuracy by increasing dot density. The binary spacetime descriptors are spatially compact, as well as discriminative and robust to motion. In addition, the techniques described herein provides a precomputation strategy for these descriptors to enable the use of slanted disparity planes, at a cost comparable to methods that are limited to aggregating costs in fronto-parallel planes, and these techniques provide relatively good accuracy even for highly oblique geometry. Also, the techniques described herein provides high-confidence depth close (e.g., very close) to depth discontinuity edges.

Figure 12:
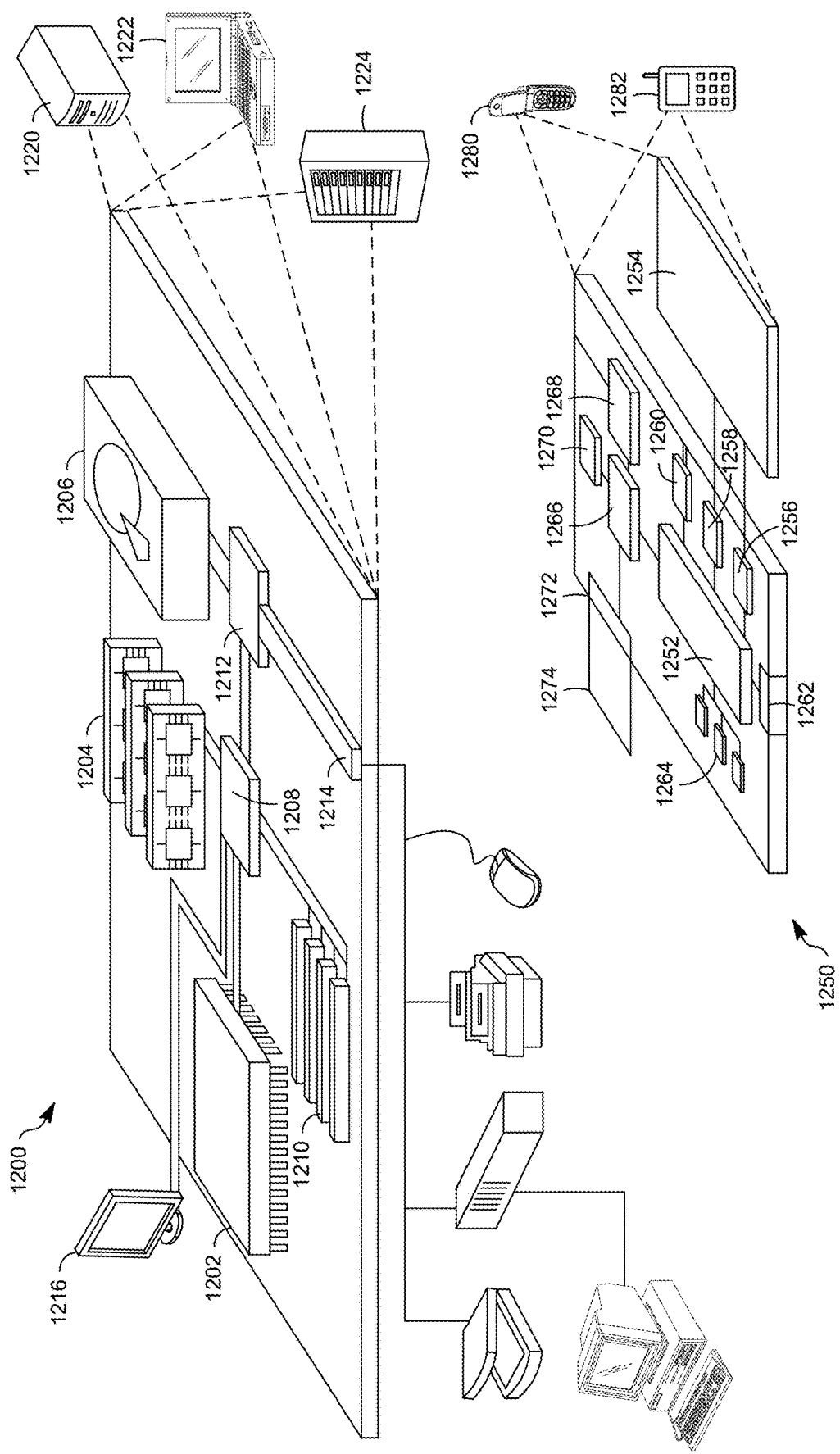
FIG. 12 shows an example of a computer device and a mobile computer device according to an aspect.

FIG. 12 shows an example of a computer device 1200 and a mobile computer device 1250, which may be used with the techniques described here. Computing device 1200 is intended to represent various forms of digital computers, such as laptops, desktops, workstations, personal digital assistants, servers, blade servers, mainframes, and other appropriate computers. Computing device 1250 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk.

The storage device 1206 is capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1204, the storage device 1206, or memory on processor 1202.

The high speed controller 1208 manages bandwidth-intensive operations for the computing device 1200, while the low speed controller 1212 manages lower bandwidth-intensive operations. Such allocation of functions is exemplary only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD (Thin-Film-Transistor Liquid Crystal Display) or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provide in communication with processor 1252, to enable near area communication of device 1250 with other devices. External interface 1262 may provide, for example, for wired communication in some examples, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provide as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252, that may be received, for example, over transceiver 1268 or external interface 1262.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, Wi-Fi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250. The computing device 1250 may be implemented in a number of different forms, as shown in the figure. For example, it may be implemented as a cellular telephone 1280. It may also be implemented as part of a smart phone 1282, personal digital assistant, or other similar mobile device.

In some examples, the real-time active stereo system 100 is included within a three-dimensional telepresence system. The three-dimensional telepresence system may provide a more realistic face-to-face experience than traditional videoconferencing systems without the use of head-mounted displays and 3-D glasses. Videoconferencing and image conferencing systems are some examples of telepresence systems.

Figure 13:
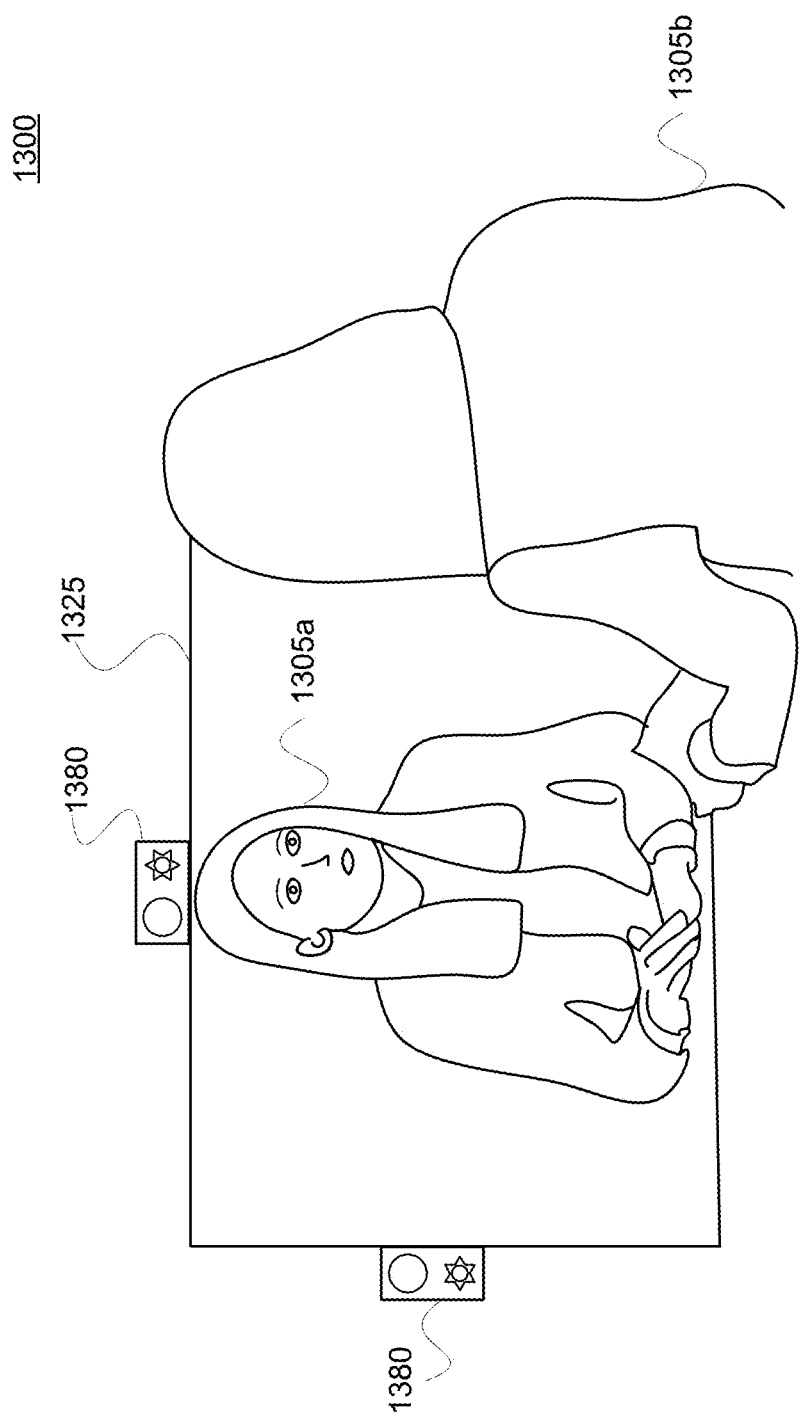
FIG. 13 illustrates a three-dimensional telepresence system according to an aspect.

FIG. 13 illustrates a three-dimensional telepresence system 1300 according to an aspect. The three-dimensional telepresence system 1300 may be configured to execute the local stereo reconstruction algorithm 120 of FIG. 1 according to the techniques described herein.

Two users 1305*a* and 1305*b* can use the three-dimensional telepresence system 1300 to communicate remotely but still face-to-face. A first user 1305*a* is at a remote location from a second user 1305*b*. The second user 1305*b* sees a three-dimensional graphic image of the first user 1305*a* on a display 1325. In some examples, the display 1325 is at a distance from the second user 1305*b* and of an appropriate size to simulate co-presence of the first user 1305*a* and the second user 1305*b*. For example, the display 1325 may be positioned 1 m across the table from second user 1305*b*, and the display 1325 may be a 1 m display. A camera assembly 1380 can be configured to capture visible light and infrared light (e.g., the stereo image data 114 of FIGS. 1 and 2) which can be used by the three-dimensional telepresence system 1300 (e.g., by the terminal used by second user 1305*b*) to display a three-dimensional stereoscopic image of the second user 1305*b* on a display viewable by first user 1305*a* (which is not shown in FIG. 13). In some examples, the camera assembly 1380 includes the capture system 102 of FIG. 1. In some examples, one or more microphones and/or speakers (e.g., speaker arrays) can be included in the system 1300. In such systems 1300, the microphone(s) and/or speaker(s) can be used to simulate spatial audio (e.g., sounds being produced spatially dependent on location of origin).

Figure 14:
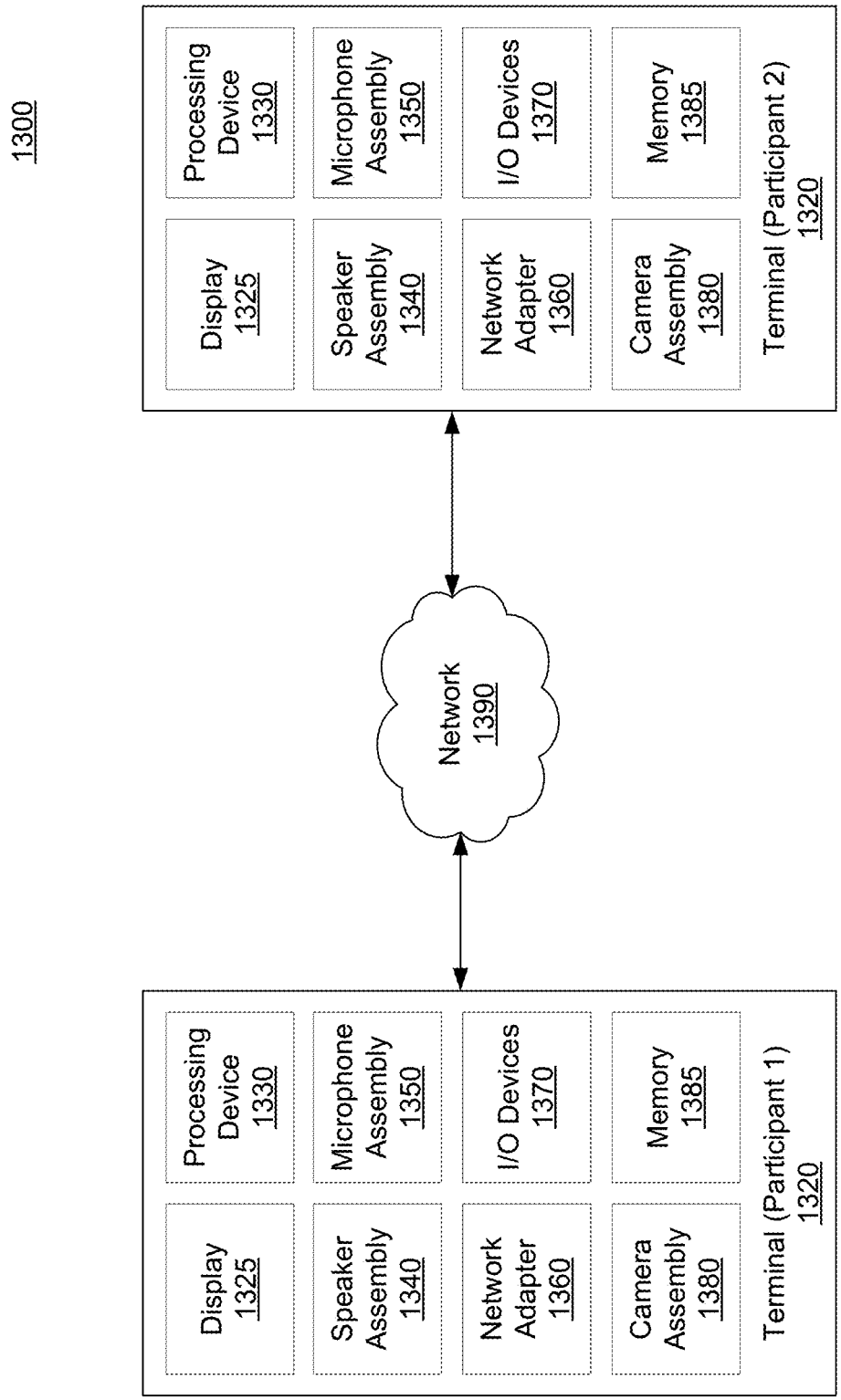
FIG. 14 illustrates, in block form, the three-dimensional telepresence system for conducting three-dimensional video conferencing between two users according to an aspect.

FIG. 14 illustrates, in block form, the three-dimensional telepresence system 1300 for conducting three-dimensional video conferencing between two users according to an aspect. In some examples, each terminal 1320, corresponding to respective users (e.g., a first participant and a second participant) can communicate using a network 1390.

The three-dimensional telepresence system 1300 can be computerized, where each of the illustrated components includes a computing device, or part of a computing device, that is configured to communicate with other computing devices via the network 1390. For example, each terminal 1320 can include one or more computing devices, such as a desktop, notebook, or handheld computing device that is configured to transmit and receive data to/from other computing devices via the network 1390. In some examples, each terminal 1320 may be a special purpose teleconference device where each component of the terminal 1320 is disposed within the same housing. In some examples, communication between each terminal 1320 may be facilitated by one or more servers or computing clusters (not shown) which manage conferencing set-up, tear down, and/or scheduling. In some examples, the terminals 1320 may communicate using point-to-point communication protocols.

The terminal 1320 can be used by participants in a videoconference. In some examples, the participants use identical terminals. For example, each participant may use the same model number of terminal 1320 with the same configuration or specification, or terminals 1320 that have been configured in a similar way to facilitate communication during the video conference. In some examples, terminals used by participants may differ but are each configured to send and receive image and depth data (e.g., the depth maps 122 of FIG. 1) and generate three-dimensional stereoscopic images without the use of head-mounted displays or three-dimensional glasses. For ease of discussion, the example of FIG. 14 presents identical terminals 1320 on both ends of the three-dimensional telepresence system 1300.

The terminal 1320 includes a display 1325, a camera assembly 1380, and a processing device 1330. In some examples, the display 1325 can include a glasses-free lenticular three-dimensional display. The camera assembly 1380 may include the capture system 102 of FIG. 1. The processing device 1330 may include the depth sensing computing system 104 of FIG. 1.

The processing device 1330 may perform functions and operations to command (e.g., trigger) the display 1325 to display images. In some examples, the processing device 1330 may be in communication with the camera assembly 1380 to receive the stereo image data 114 of FIG. 1, and the processing device 1330 is configured to execute the local stereo reconstruction algorithm 120 of FIG. 1 based on the stereo image data 114 in order to generate the depth maps 122 according to the techniques discussed herein. The processing device 1330 may also be in communication with a network adapter 1360 to receive image data and depth data (e.g., the depth maps 122 of FIG. 1) from other terminals 1320 participating in a videoconference. The processing device 1330 may use the position and location data received from the camera assembly 1380 and the image data and depth data from the network adapter 1360 to render three-dimensional stereoscopic images on the display 1325. In some examples, the processing device 1330 may compress or encode the image data and/or depth data so that it requires less memory or bandwidth before it communicates the image data or the depth data over the network 1390. Likewise, the processing device 1330 may decompress or decode received image data or depth data before the processing device 1330 renders stereoscopic three-dimensional images.

According to some examples, the terminal 1320 can include a speaker assembly 1340 and a microphone assembly 1350. The speaker assembly 1340 may project audio corresponding to audio data received from other terminals 1320 in a videoconference. The speaker assembly 1340 may include one or more speakers that can be positioned in multiple locations to, for example, project directional audio. The microphone assembly 1350 may capture audio corresponding to a user of the terminal 1320. The microphone assembly 1350 may include one or more speakers that can be positioned in multiple locations to, for example, project directional audio. In some examples, a processing unit (e.g., processing device 1330) may compress or encode audio captured by the microphone assembly 1350 and communicated to other terminals 1320 participating in the videoconference via the network adapter 1360 and the network 1390.

The terminal 1320 can also include I/O devices 1370. The I/O devices 1370 can include input and/or output devices for controlling the videoconference in which the terminal 1320 is participating. For example, the I/O devices 1370 can include buttons or touch screens which can be used to adjust contrast, brightness, or zoom of the display 1325. The I/O devices 1370 can also include a keyboard interface which may be used to annotate images rendered on the display 1325, or annotations to communicate to other terminals 1320 participating in a videoconference.

The terminal 1320 may include memory 1385. The memory 1385 may be a volatile memory unit or units or nonvolatile memory units or units depending on the implementation. The memory 1385 may be any form of computer readable medium such as a magnetic or optical disk, or solid-state memory. The memory 1385 may store instructions that cause the processing device 1330 to perform functions and operations consistent with disclosed examples.

The terminals 1320 of the three-dimensional telepresence system 1300 communicate various forms of data between each other to facilitate videoconferencing. In some examples, the terminals 1320 may communicate image data, depth data (e.g., the depth maps 122), audio data, and/or location data corresponding to each respective user of the terminal 1320. The processing device 1330 of each terminal 1320 may use received image data, depth data, and/or location data to render stereoscopic three-dimensional images on the display 1325. The processing device 1330 can interpret audio data to command the speaker assembly 1340 to project audio corresponding to the audio data. In some examples, the image data, depth data, audio data, and/or location data may be compressed or encoded and the processing device 1330 may perform functions and operations to decompress or decode the data.

Depending on the implementation, the network 1390 can include one or more of any type of network, such as one or more local area networks, wide area networks, personal area networks, telephone networks, and/or the Internet, which can be accessed via any available wired and/or wireless communication protocols. For example, the network 1390 can include an Internet connection through which each terminal 1320 communicate. Any other combination of networks, including secured and unsecured network communication links are contemplated for use in the systems described herein.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A real-time active stereo system comprising:
    a capture system configured to capture stereo image data, the stereo image data including a plurality of pairs of a reference image and a secondary image, each pair of the plurality of pairs is associated with a different frame of the stereo image data, and a temporal window is associated with at least two frames of the stereo image data; and
    a depth sensing computing system including at least one processor and a non-transitory computer-readable medium having executable instructions that when executed by the at least one processor are configured to execute a local stereo reconstruction algorithm configured to compute spacetime descriptors, the spacetime descriptors being calculated across the temporal window and generate depth maps based on the spacetime descriptors.

2. The real-time active stereo system of claim 1, wherein the capture system includes one or more projectors configured to project structured light for a subset of the plurality of pairs.

3. The real-time active stereo system of claim 1, wherein the capture system includes a non-structured light source configured to project non-structured lighting for at least one of the plurality of pairs.

4. The real-time active stereo system of claim 1, wherein the spacetime descriptors are computed over a spacetime window with a spatial extent of a predetermined size and a temporal extent of a predetermined size.

5. The real-time active stereo system of claim 4, wherein the spatial extent is 3×3 pixels, and the temporal extent is 4 temporal windows.

6. The real-time active stereo system of claim 1, wherein each of the spacetime descriptors includes a number of pair-wise intensity comparisons in a spacetime window.

7. The real-time active stereo system of claim 6, wherein the number of pair-wise intensity comparisons include comparisons between randomly selected pixels in a same time window, and comparisons between unconstrained random pairs in different time windows.

8. The real-time active stereo system of claim 1, wherein the local stereo reconstruction algorithm is configured to divide the stereo image data into regions of a predetermined size, and iteratively sample the spacetime descriptors along a plurality of slanted plane hypotheses for each of the regions.

9. The real-time active stereo system of claim 8, wherein each of the regions is a rectangle tile of a same size.

10. The real-time active stereo system of claim 1, wherein the local stereo reconstruction algorithm is configured to compute costs of disagreement between the spacetime descriptors.

11. The real-time active stereo system of claim 10, wherein the local stereo reconstruction algorithm is configured to filter the costs of disagreement using an edge-aware filter.

12. A method for real-time active stereo comprising:
capturing, by a capture system, stereo image data, the stereo image data including a plurality of pairs of a reference image and a secondary image, each pair of the plurality of pairs is associated with a different frame of the stereo image data, and a temporal window is associated with at least two frames of the stereo image data; and
executing, by a depth sensing computing system, a local stereo reconstruction algorithm that generates depth maps based on the stereo image data, the executing including pre-computing spacetime descriptors, the spacetime descriptors being calculated across the temporal window, dividing the stereo image data into regions of a predetermined size, and iteratively sampling the spacetime descriptors along a plurality of slanted plane hypotheses for each of the regions.

13. The method of claim 12, wherein the capturing includes projecting first patterned lighting for a first pair of the plurality of pairs, projecting second patterned lighting for a second pair of the plurality of pairs, and projecting non-patterned lighting for a third pair of the plurality of pairs.

14. The method of claim 12, wherein the spacetime descriptors are not re-computed during the iteratively sampling step.

15. The method of claim 12, wherein each of the spacetime descriptors includes a number of pair-wise intensity comparisons in a spacetime window.

16. The method of claim 12, wherein the executing includes:
computing costs of disagreement between the spacetime descriptors using Hamming distance between the spacetime descriptors; and
filtering the costs of disagreement using an edge-aware filter.

17. A non-transitory computer-readable medium storing executable instructions that when executed by at least one processor are configured to cause the at least one processor to:
receive stereo image data, the stereo image data including a plurality of pairs of a reference image and a secondary image, each pair of the plurality of pairs is associated with a different frame of the stereo image data, and a temporal window is associated with at least two frames of the stereo image data; and
execute a local stereo reconstruction algorithm configured to generate depth maps in real-time based on the stereo image data, including:
compute spacetime descriptors over a pre-defined spacetime window, the spacetime descriptors being calculated across the temporal window;
divide the stereo image data into regions of a predetermined size; and
evaluate a plurality of slanted plane hypotheses for each of the regions using the spacetime descriptors.

18. The non-transitory computer-readable medium of claim 17, wherein the pre-defined spacetime window has a spatial extent and a temporal extent, the temporal extent of the pre-defined spacetime window being less than a temporal extent of the stereo image data.

19. The non-transitory computer-readable medium of claim 17, wherein each of the spacetime descriptors includes a number of pair-wise intensity comparisons in the spacetime window.

20. The non-transitory computer-readable medium of claim 17, wherein the plurality of slanted plane hypotheses for multiple regions are evaluated at least partially in parallel.

21. The real-time active stereo system of claim 1, wherein the spacetime descriptors include pixel comparison information.

* * * * *